(12) United States Patent
Matsushita et al.

(10) Patent No.: US 11,623,139 B2
(45) Date of Patent: Apr. 11, 2023

(54) INFORMATION PROCESSING SYSTEM, STORAGE MEDIUM, INFORMATION PROCESSING APPARATUS, AND GAME PROCESSING METHOD

(71) Applicant: NINTENDO CO., LTD., Kyoto (JP)

(72) Inventors: Shingo Matsushita, Kyoto (JP); Yuji Ohashi, Kyoto (JP); Keisuke Ohtani, Kyoto (JP); Kouhei Maeda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/329,581

(22) Filed: May 25, 2021

(65) Prior Publication Data

US 2021/0402293 A1 Dec. 30, 2021

(30) Foreign Application Priority Data

Jun. 26, 2020 (JP) .............................. JP2020-110621

(51) Int. Cl.
*A63F 13/352* (2014.01)
*A63F 13/46* (2014.01)
*A63F 13/48* (2014.01)

(52) U.S. Cl.
CPC ............ *A63F 13/352* (2014.09); *A63F 13/46* (2014.09); *A63F 13/48* (2014.09)

(58) Field of Classification Search
CPC ........ A63F 13/352; A63F 13/45; A63F 13/46; A63F 13/48; A63F 13/50; A63F 13/55; A63F 13/58; A63F 13/70; A63F 13/79; A63F 2300/61
See application file for complete search history.

(56) References Cited

U.S. PATENT DOCUMENTS

| | | | |
|---|---|---|---|
| 2013/0090171 A1* | 4/2013 | Holton | A63F 13/795 463/42 |
| 2015/0038226 A1* | 2/2015 | Maeda | A63F 13/35 463/31 |
| 2018/0071632 A1* | 3/2018 | Takahashi | A63F 13/25 |
| 2020/0139247 A1* | 5/2020 | Shigeta | A63F 13/795 |
| 2021/0016166 A1* | 1/2021 | Nelson, Jr. | A63F 13/795 |

OTHER PUBLICATIONS

"Take Part in Raids to Increase Your AR Tier!", [online] Nintendo Co., Ltd., [searched on Jun. 22, 2020], internet https://guide.fire-emblem-heros.com/en-GB/eve004/ (https://web.archive.org/web/20201025081818/https://guide.fire-emblem-heroes.com/en-GB/eve004/) , 10 pages.

* cited by examiner

*Primary Examiner* — Omkar A Deodhar
(74) *Attorney, Agent, or Firm* — Nixon & Vanderhye P.C.

(57) ABSTRACT

An example information processing system executes a process using values of scores of a plurality of users that are updated based on a result of a game. When a first game is selected from games, the first game is executed, in which the result of the game is determined based on a first user's game operation in the first game, and an opponent based on data of a second user different from the first user. When a second game is selected from games, the second game is executed, in which the result of the game is determined independently of the first user's game operation performed in the second game. The information processing system updates the first user's score and the second user's score based on a result of the first game, and updates at least the first user's score based on a result of the second game.

13 Claims, 14 Drawing Sheets

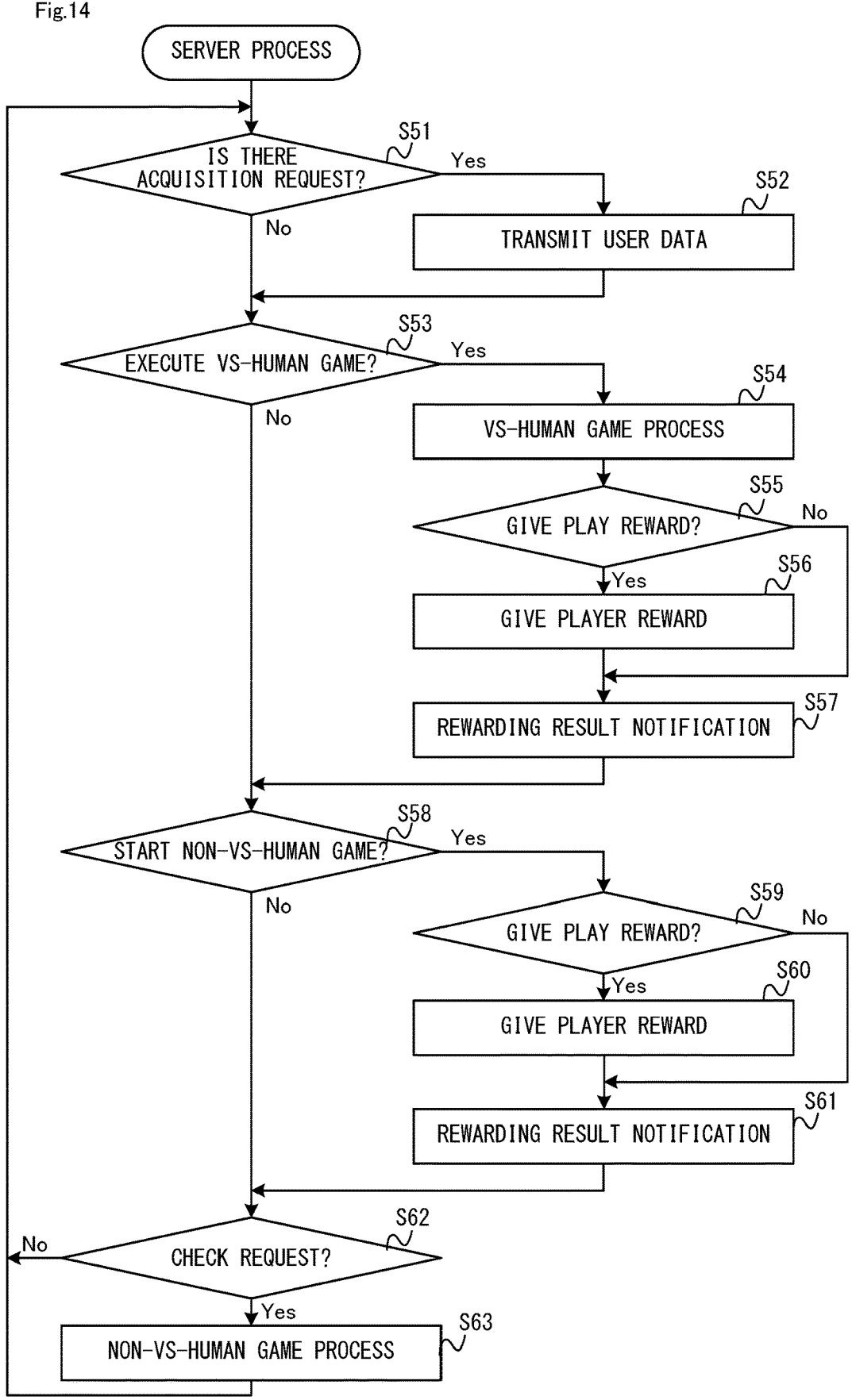

INFORMATION PROCESSING SYSTEM, STORAGE MEDIUM, INFORMATION PROCESSING APPARATUS, AND GAME PROCESSING METHOD

CROSS REFERENCE TO RELATED APPLICATION

This application claims priority to Japanese Patent Application No. 2020-110621, filed on Jun. 26, 2020, the entire contents of which are incorporated herein by reference.

FIELD

The present disclosure relates to information processing systems, storage media, information processing apparatuses, and game processing methods for executing a game.

BACKGROUND AND SUMMARY

There are conventional games in which a user competes with another user to acquire points and the users contend for a higher score.

In such games in which users compete with each other, the amusingness of the game increases as the number of users participating in the game increases. Therefore, it is preferable that users having various play styles be motivated to participate in the game.

With the above in mind, the present application discloses an information processing system, storage medium, information processing apparatus, and game processing method in which users having more various play styles are motivated to participate in a game in which a user completes with another user.

(1) An example of an information processing system executes a process using values of scores of a plurality of users that are updated based on a result of a game. The information processing system comprises: a processor and a memory coupled thereto. The processor is configured to control the information processing system to at least: select one of a first game and a second game, in the game, based on a first user's selection operation; when the first game is selected, execute the first game, in which the result of the game is determined based on the first user's game operation in the first game, and an opponent based on data of a second user different from the first user; when the second game is selected, execute the second game, in which the result of the game is determined independently of the first user's game operation performed in the second game; update the first user's score and the second user's score based on a result of the first game; and update at least the first user's score based on a result of the second game.

With the configuration (1), for example, a user having a play style who does not tend to perform the first game can be motivated to participate in the game, i.e., users having various play styles can be motivated to participate in the game.

(2) When a game result is obtained in the second game, the processor may update the first user's score based on a calculation method with which an increase in the score is smaller than when the same game result is obtained in the first game.

With the configuration (2), the possibility that the user becomes less motivated to perform the first game and mostly performs the second game can be reduced.

(3) The processor may be configured to further control the information processing system to: reduce a parameter in response to execution of the first game or the second game. The processor may limit execution of the first game when the parameter is smaller than a first value. The processor limits execution of the second game when the parameter is smaller than a second value that is the same as or different from the first value.

With the configuration (3), the user is driven to increase the score by performing the game a limited number of times, and therefore, the strategic aspect of the game in which the score is acquired is enhanced, resulting in an improvement in the amusingness of the game.

(4) The processor may limit the number of times of execution related to the second game during a predetermined period independently of a value of the parameter.

With the configuration (4), the number of times the user performs the second game during the first period can be limited, and therefore, the possibility that the second game is mostly performed can be reduced.

(5) The processor may start the second game in response to selection of the second game. The processor may update the first user's score based on the result of the second game that is determined after a predetermined time has passed since start of the second game. The processor may limit execution of the next second game until at least the predetermined time has passed since start of the second game.

With the configuration (5), the repeated execution of the second game by the user within the first time can be limited, and therefore, the possibility that the second game is mostly performed can be reduced.

(6) The processor may execute the first game in response to selection of the first game even before the predetermined time has passed since start of the second game.

With the configuration (6), the user more easily starts both the first game and the second game at a flexible timing.

(7) The processor may start the first game in response to selection of the first game, and following the start, receives the first user's game operation, and ends the first game in response to determination of the result of the first game based on the first user's game operation. The processor may end the second game in response to determination of the result of the second game after the predetermined time has passed since start of the second game. The processor may be configured to further control the information processing system to: give a reward to the first user in response to end of the first game or start of the second game, under a condition.

With the configuration (7), the user who has started the second game can acquire a reward without waiting for the end of the game that occurs after the first time has passed since the start of the game, resulting in an improvement in the user's convenience.

(8) The processor may present the result of the second game to the first user in response to the first user's operation performed after the predetermined time has passed since start of the second game.

With the configuration (8), the user can check a game result of the second game at a desired timing, resulting in an improvement in the user's convenience.

(9) A game rule of the first game and a game rule of the second game may be at least partially the same.

With the configuration (9), the user can feel the integrity of the two types of games, i.e., the first and second games, and therefore, the user can be less likely to feel unnaturalness.

(10) The processor may execute the second game using a game content usable in the first game.

With the configuration (10), the user who has been performing one of the first and second games can start the other game without newly preparing game contents. Therefore, the user can be motivated to perform the first and second games.

Note that non-limiting examples of an information processing apparatus (e.g., a terminal apparatus or a server) that executes the processes of (1)-(10) are herein disclosed. Non-limiting examples of a storage medium storing an information processing program (specifically, a game program) that causes a computer to execute all or a portion of the processes of (1)-(10) are also herein disclosed. Non-limiting examples of an information processing method (specifically, a game processing method) that is executed in the information processing system of (1)-(10) are herein disclosed.

With the above information processing system, storage medium, information processing apparatus, and game processing method, users having more various play styles are motivated to participate in a game in which a user competes with another user.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 14 is a flowchart showing a non-limiting example of a flow of a server process that is executed by a server.

DETAILED DESCRIPTION OF NON-LIMITING EXAMPLE EMBODIMENTS

[1. Configuration of Information Processing System]

Figure 1:
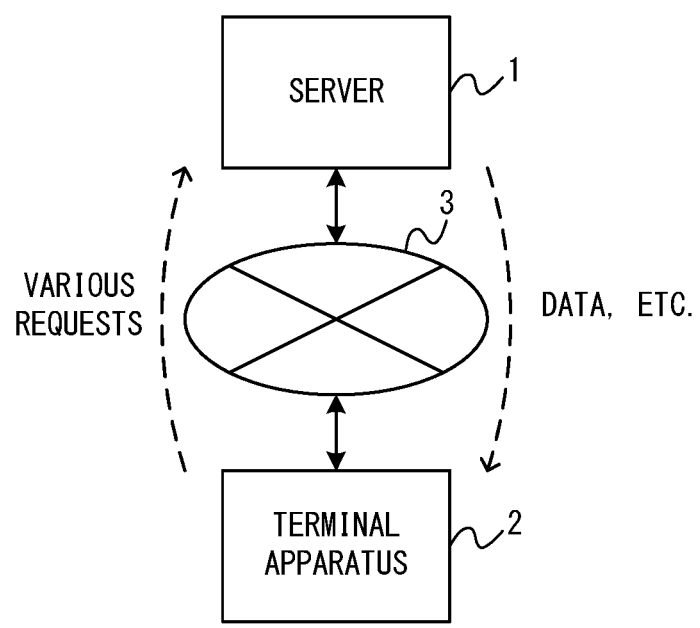
FIG. 1 is a block diagram showing a non-limiting example configuration of an information processing system according to the present embodiment.

Hereinafter, an information processing system, an information processing program, and an information processing method according to the present embodiment will be described. Firstly, description will be given of the overall configuration of the information processing system and the configurations of the terminal apparatus and a server included in the information processing system according to the present embodiment. FIG. 1 is a block diagram showing a non-limiting example of the configuration of the information processing system according to the present embodiment. As shown in FIG. 1, the information processing system includes a server 1 and a terminal apparatus 2. The server 1 and the terminal apparatus 2 are connectable to a network 3, such as the Internet and/or a mobile communication network. The server 1 and the terminal apparatus 2 are communicable with each other via the network 3.

The server 1 is a server for providing services related to an application (specifically, a game application) to be executed in the terminal apparatus 2. In the present embodiment, the server 1 is a game server for a game to be executed in the terminal apparatus 2, and provides an environment for a game process to be executed in the terminal apparatus 2. For example, in response to a request from the terminal apparatus 2 that executes the game process, the server 1 executes a game process according to need, and transmits, to the terminal apparatus 2, data complying with the request (refer to FIG. 1).

The terminal apparatus 2 is a non-limiting example of an information processing apparatus possessed by a user. Examples of the terminal apparatus 2 include a smart phone, a hand-held or stationary game apparatus, a mobile phone, a tablet terminal, a personal computer, and a wearable terminal. The terminal apparatus 2 is able to execute a game program (in other words, a game application) for a game for which the server 1 provides services.

(Specific Example of Configuration of Server 1)

Figure 2:
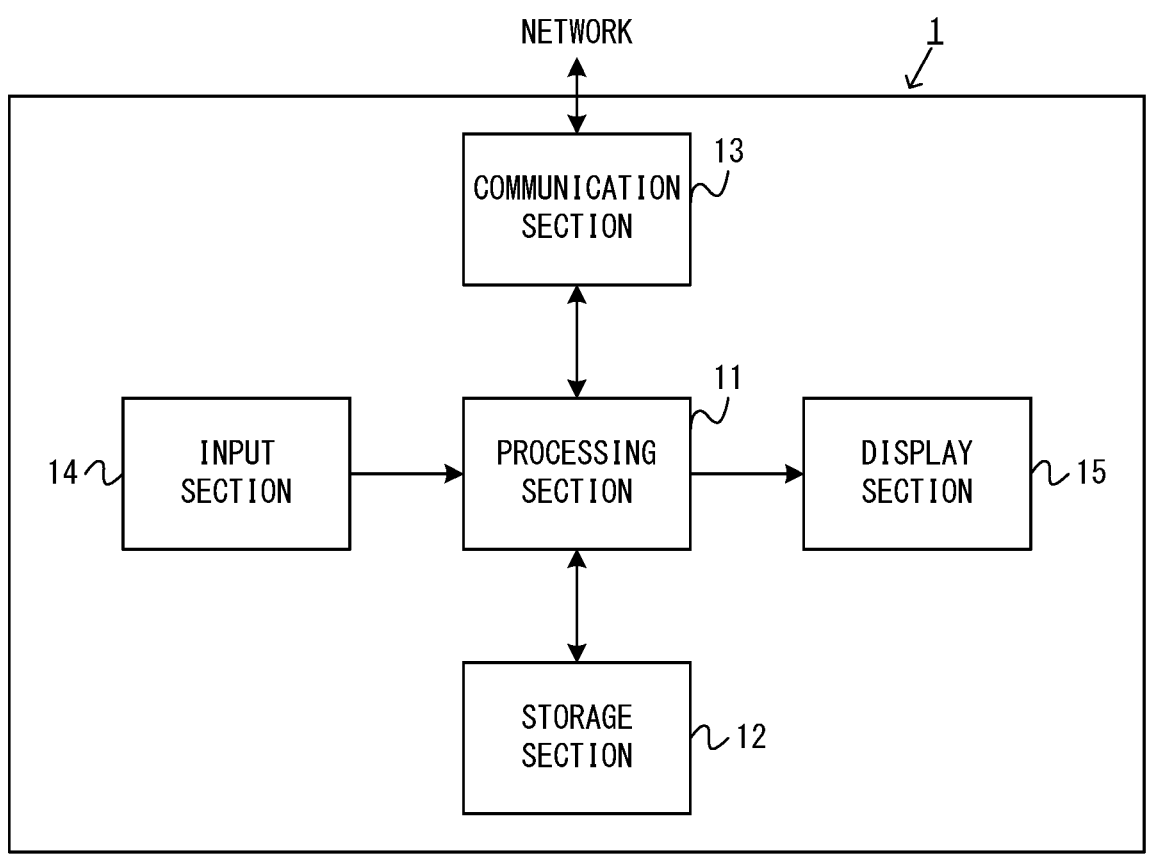
FIG. 2 is a block diagram showing a non-limiting example of a configuration of a server.

FIG. 2 is a block diagram showing a non-limiting example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 stores therein at least a program for a game process that is to be executed on the server side for a game process to be executed in the terminal apparatus 2.

The server 1 includes a communication section 13. The communication section 13 is connected to the network 3, and has a function of communicating with other devices (e.g., the terminal apparatus 2) via the network 3. Using the communication section 13, the processing section 11 transmits information to the other devices and receives information from the other devices. The server 1 further includes an input section 14 and a display section 15 as input/output interfaces.

(Specific Example of Configuration of Terminal Apparatus 2)

Figure 3:
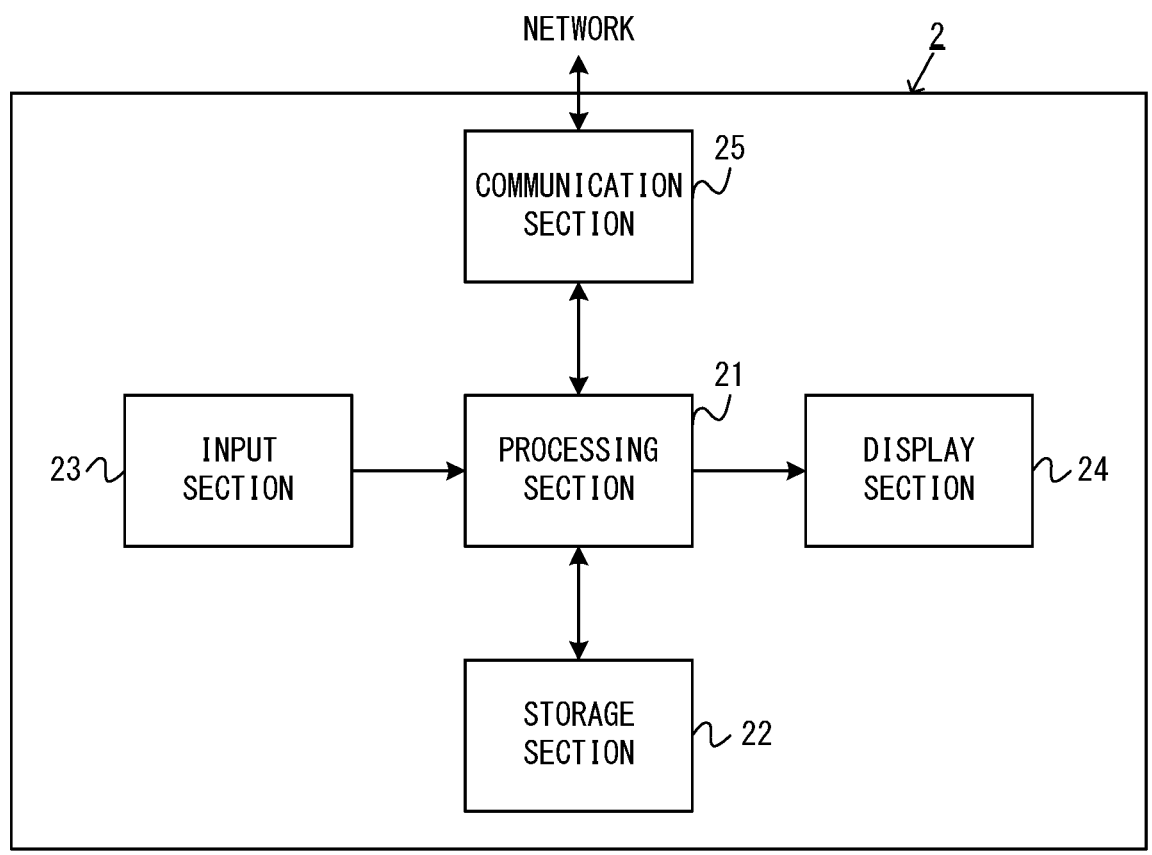
FIG. 3 is a block diagram showing a non-limiting example of a configuration of a terminal apparatus.

FIG. 3 is a block diagram showing a non-limiting example of the configuration of the terminal apparatus 2. As shown in FIG. 3, the terminal apparatus 2 includes a processing section 21 and a storage section 22. The processing section 21 is electrically connected to the components 22 to 25 of the terminal apparatus 2. The processing section 21 includes a CPU (in other words, a processor) and a memory. In the terminal apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the terminal apparatus 2, or may be a storage medium (e.g., a card type storage medium) attachable/detachable with respect to the main body unit. The program may be stored in the main body unit by being downloaded from the server 1 to the terminal apparatus 2.

The terminal apparatus 2 includes an input section 23. The input section 23 outputs data based on an input performed by the user to the processing section 21. The processing section 21 determines the content of an input performed by the user based on data from the input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the terminal apparatus 2, or may be an input device (e.g., a game controller) separated from the main body unit.

The terminal apparatus 2 includes a display section 24. The display section 24 displays an image (e.g., a game image, etc.) that is generated through information processing executed in the processing section 21 of the terminal apparatus 2. The display section 24 may be a display device provided in the main body unit of the terminal apparatus 2, or may be a display device separated from the main body unit. The terminal apparatus 2 may include a speaker, a microphone, and/or a camera, etc.

The terminal apparatus 2 includes a communication section 25. In the present embodiment, the communication section 25 has a function of performing communication while being connected to a mobile communication network (in other words, a mobile telephone communication network). That is, the terminal apparatus 2 (specifically, the processing section 21) is connected to the network 3 by using the communication section 25 (in other words, through the communication section 25) via the mobile communication network, and communicates with other devices (e.g., the server 1, etc.). Using the communication section 25, the processing section 21 transmits information to the other devices and receives information from the other devices. The configuration of the communication section, through which the terminal apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

[2. Overview of Process in Information Processing System]

An overview of a process that is executed in the information processing system according to the present embodiment will now be described. In the present embodiment, the user of the terminal apparatus 2 plays, in a game application, a battle game in which the user competes with another user and contends for a higher score (also referred to as a "rate") corresponding to a game result. The information processing system calculates a score for each user of the game application, and executes a process based on the scores. This process includes, for example, ranking users in order of score, and giving users a reward according to score.

Note that in the present embodiment, the battle game refers to a simulation game in which a character is caused to serve as a unit (in other words, a piece) to fight against an enemy character (also referred to as an "enemy unit"). Note that the type and genre of the battle game are not particularly limited, and the battle game may be a puzzle game or a fighting game. Characters are, for example, a human being that appears in the game, but are not limited to a human being, and may be any suitable entity that has individuality in game settings. For example, characters may be an animal, weapon, item, or the like.

In the game application of the present embodiment, two types of games, i.e., a vs-human game and a non-vs-human game, are prepared in a game mode in which the battle game, in which a score is calculated, is performed (hereinafter referred to as a "score acquisition mode"). Note that in the score acquisition mode, other games different from a vs-human game and a non-vs-human game may be prepared. The game application may include other game modes different from the score acquisition mode.

The vs-human game refers to a game in which a user plays a battle game against another user, and performs a game operation (i.e., an operation on a character) in the battle game. Note that the "battle game against another user" may refer to either a battle game which is performed using game data related to the second user (e.g., game data of a character possessed by the second user) or a battle game in which the second user performs a game operation. In the present embodiment, the "battle game against another user" is one in which a character possessed by the second user is used as an enemy character (defensive character described below), the second user does not perform a game operation, and the enemy character is operated by the information processing system.

The non-vs-human game refers to a game in which a battle game is performed against a character prepared by the information processing system (i.e., a character other than characters possessed by other users) as an enemy character, and the user does not perform a game operation in the battle game. Specifically, in the present embodiment, in a battle game performed in a non-vs-human game, a character possessed by the user (an offensive character described below) and a character prepared by the information processing system (a defensive character described below) are both operated by the information processing system. As described in detail below, the difficulty of the non-vs-human game is set to be lower than the difficulty of the vs-human game.

[2-1. During Start of Score Acquisition Mode]

Figure 4:
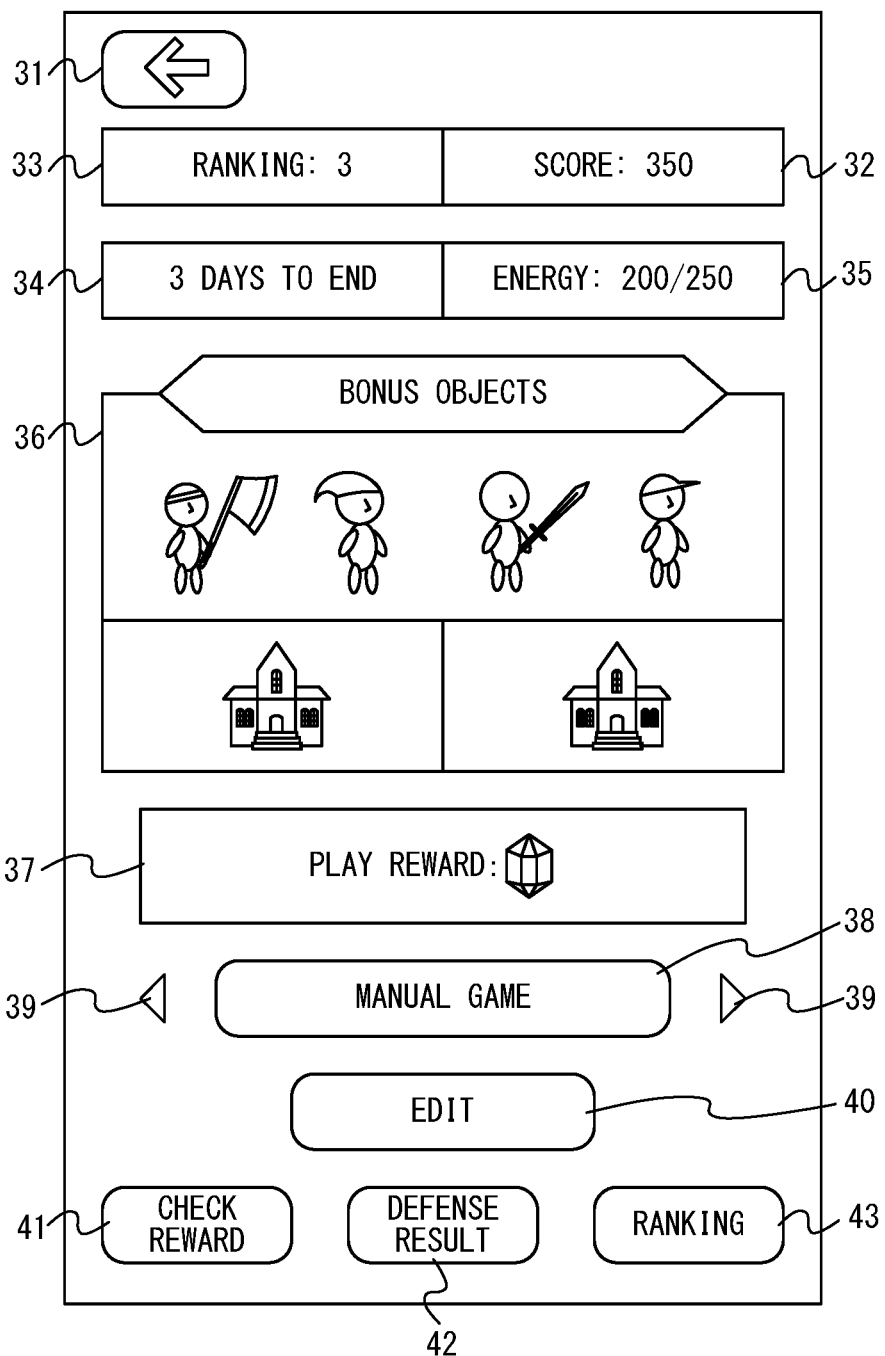
FIG. 4 is a diagram showing a non-limiting example of a selection image for selecting a vs-human game or a non-vs-human game.

A process during the start of the score acquisition mode will be described with reference to FIG. 4. FIG. 4 is a diagram showing a non-limiting example of a selection image for selecting a vs-human game or a non-vs-human game. In the present embodiment, when the score acquisition mode is started, the terminal apparatus 2 displays the selection image of FIG. 4 on the display section 24.

The selection image includes a mode end button 31 for giving an instruction to end the score acquisition mode. Specifically, when the user gives input to the mode end button 31, the information processing system ends the score acquisition mode. Note that in the present embodiment, input to each button (e.g., an image indicating a button) displayed on the display section 24 is, for example, performed by touching the button.

The selection image includes a score image 32 and a ranking image 33. The score image 32 indicates the current score of the user (350 in FIG. 4). The ranking image 33 indicates the current ranking of the user (3 in FIG. 4). Note that in the present embodiment, the information processing system determines the ranking of each user based on the score of that user. Specifically, the information processing system determines rankings such that a user having a higher score has a higher ranking. Note that in another non-limiting example embodiment, rankings may not be set for users.

The selection image includes a game period image 34. Here, in the present embodiment, the information processing system sets a game period during which a game can be performed in the score acquisition mode. The game period is, for example, set to a week from a predetermined start timing. The information processing system calculates the score of each user based on a game result of a battle game performed during the game period, and gives the user a reward corresponding to the score after the end of the game period (the reward is referred to as a "period reward," which is distinguished from a "play reward" described below). For example, the information processing system gives each user a reward depending on the ranking (specifically, a higher reward for a higher ranking) as the period reward. The game period image 34 indicates a time lasting until the end of the current game period (3 days in FIG. 4). Note that the game period image 34 may indicate a time at which the game period will end. Note that when a new game period starts after the previous game period has ended, the score of each user at the end of the previous game period may be carried over, or may be reset to a predetermined value (e.g., a value obtained by rounding the score at the end of the previous game period down to the nearest hundred).

The selection image includes an energy value image 35 indicating an energy value. The energy value is a game parameter that is used by the user to perform a vs-human game or a non-vs-human game. In the present embodiment, the user can perform a vs-human game or a non-vs-human game in exchange of subtraction of a reference consumption amount (e.g., 50) from the energy value set for the user. Note that if the energy value set for the user is less than the reference consumption amount, the information processing system limits a vs-human game or non-vs-human game performed by the user. The energy value image 35 indicates the current energy value (200 in FIG. 4) and maximum energy value (250 in FIG. 4) of the user.

The selection image includes a bonus object image 36. Here, in the present embodiment, the information processing system sets a bonus character and a bonus facility for each game period. The bonus object image 36 indicates a bonus character and a bonus facility for the current game period. Note that in the present embodiment, if a bonus character is added to a set of characters that are used in the above battle game, the score that the user can acquire is increased. For a bonus character, parameters (e.g., offensive power and defensive power) indicating the ability of the character may be increased in the above battle game. In the present embodiment, if a bonus facility is added to a set of facilities (described below) that are used in a battle game, an advantageous game effect to the battle game is provided. Note that in FIG. 4, a bonus facility related to an offensive facility is displayed in a lower left field of the bonus object image 36, and a bonus facility related to a defensive facility is displayed in a lower right field of the bonus object image 36. Note that the offensive facility and the defensive facility are described below.

The selection image includes a play reward image 37 indicating details of a play reward. In the present embodiment, apart from the above period reward, a play reward is prepared which is given to the user when the user plays a vs-human game or a non-vs-human game. Specifically, when the user plays a vs-human game or a non-vs-human game, the information processing system gives the user a play reward (jewelry in the non-limiting example of FIG. 4) indicated by the play reward image 37 only once a predetermined time (e.g., 1 day).

In FIG. 4, the selection image includes a vs-human game button 38 for giving an instruction to start a vs-human game. When the user gives input to the vs-human game button 38, the information processing system executes a vs-human game. Note that in the present embodiment, the vs-human game is a game in which the user performs a game operation in a battle game. Therefore, the vs-human game button 38 of FIG. 4 is, for example, denoted by "MANUAL GAME."

Note that the selection image may include a non-vs-human game button (see FIG. 7) related to a non-vs-human game instead of the vs-human game button 38. Here, the selection image includes a change button 39 for giving an instruction to change the vs-human game button to the non-vs-human game button or vice versa (two change buttons 39 in FIG. 4). When the user gives input to the change button 39, the terminal apparatus 2 changes the vs-human game button 38, being currently displayed, to the non-vs-human game button, or changes the non-vs-human game button, being currently displayed, to the vs-human game button 38.

The selection image includes an edit button 40 for giving an instruction to edit a game map that is used in a battle game. Here, in the present embodiment, characters and facilities can be previously recorded that may be disposed on a game map in a battle game. When the user gives input to the edit button 40, the terminal apparatus 2 displays, on the display section 24, an edit image (not shown) for editing arrangement of a recorded character and facility, and is permitted to receive an edit operation performed by the user. Specifically, by performing an edit operation, the user can set the type and location of a facility that is disposed on a game map, and the type and location of a character that is disposed on a game map.

The selection image includes a reward confirmation button 41 for giving an instruction to display the above reward image indicating a period reward on the display section 24. When the user gives input to the reward confirmation button 41, the terminal apparatus 2 displays the reward image on the display section 24.

The selection image includes a defense result button 42 for giving an instruction to display a defense result image indicating a defense result on the display section 24. When the user gives input to the defense result button 42, the terminal apparatus 2 displays the defense result image on the display section 24. Here, in the present embodiment, in the score acquisition mode, the user of the terminal apparatus 2 may execute a vs-human game to perform a battle game against another user, or alternatively, another user may execute a vs-human game to perform a battle game against the user of the terminal apparatus 2. In the present embodiment, the former battle game is referred to as an offense-side battle game, and the latter battle game is referred to as a defense-side battle game. The defense result is a result of a defense-side battle game. Note that in a situation in which the defense result image is displayed, a defense-side battle game may be replayed or played back according to the user's instruction, in addition to displaying of a result of the defense-side battle game.

The selection image includes a ranking button 43 for giving an instruction to display a ranking image indicating the user's ranking in the score acquisition mode. When the user gives input to the defense result button 42, the terminal apparatus 2 displays the ranking image on the display section 24. The ranking image may indicate the ranking of the user of the terminal apparatus 2 of the users participating in the game application, or may indicate the rankings of top users (e.g., top 100 users) of the users participating in the game application.

[2-2. Vs-Human Game]

Next, a vs-human game will be described. In a situation in which the selection image is being displayed, when the user gives input to the vs-human game button 38, a vs-human game is started.

In the present embodiment, when receiving the user's input to the vs-human game button 38, the information processing system determines a consumption magnification factor for the energy value and a set of characters according to the user's instruction before the start of a vs-human game. For example, the terminal apparatus 2 displays a window for allowing the user to specify a consumption magnification factor and a set of characters, and is permitted to receive an instruction to specify a consumption magnification factor and a set of characters.

Note that in the present embodiment, the user can set the amount of an energy value that is to be consumed in the current vs-human game to the amount obtained by multiplying the reference consumption amount by a consumption magnification factor. Here, it is assumed that the user can specify a consumption magnification factor as one or two. Note that in a vs-human game, when the consumption magnification factor is two, the score that the user can acquire in the vs-human game is two times as great as when the consumption magnification factor is one.

Note that as described above, a vs-human game is permitted to be executed under a condition that the energy value set for the user is greater than or equal to the reference consumption amount. Therefore, in the present embodiment, if the current energy value is less than a consumption amount calculated from the consumption magnification factor specified by the user, the terminal apparatus 2 does not perform a vs-human game. In this case, the terminal apparatus 2 notifies the user that the energy value is not great enough for the user to perform a vs-human game.

The set of characters are characters that are used by the user to fight against enemies in a battle game. In the present embodiment, the user can previously record a plurality of sets (e.g., five sets) of characters usable in a battle game. The user specifies one of the recorded sets in the above window.

When a consumption magnification factor and a set of characters are specified, the information processing system starts a battle game in the current vs-human game. The terminal apparatus 2 displays a game image of the battle game on the display section 24, and starts the battle game.

Figure 5:
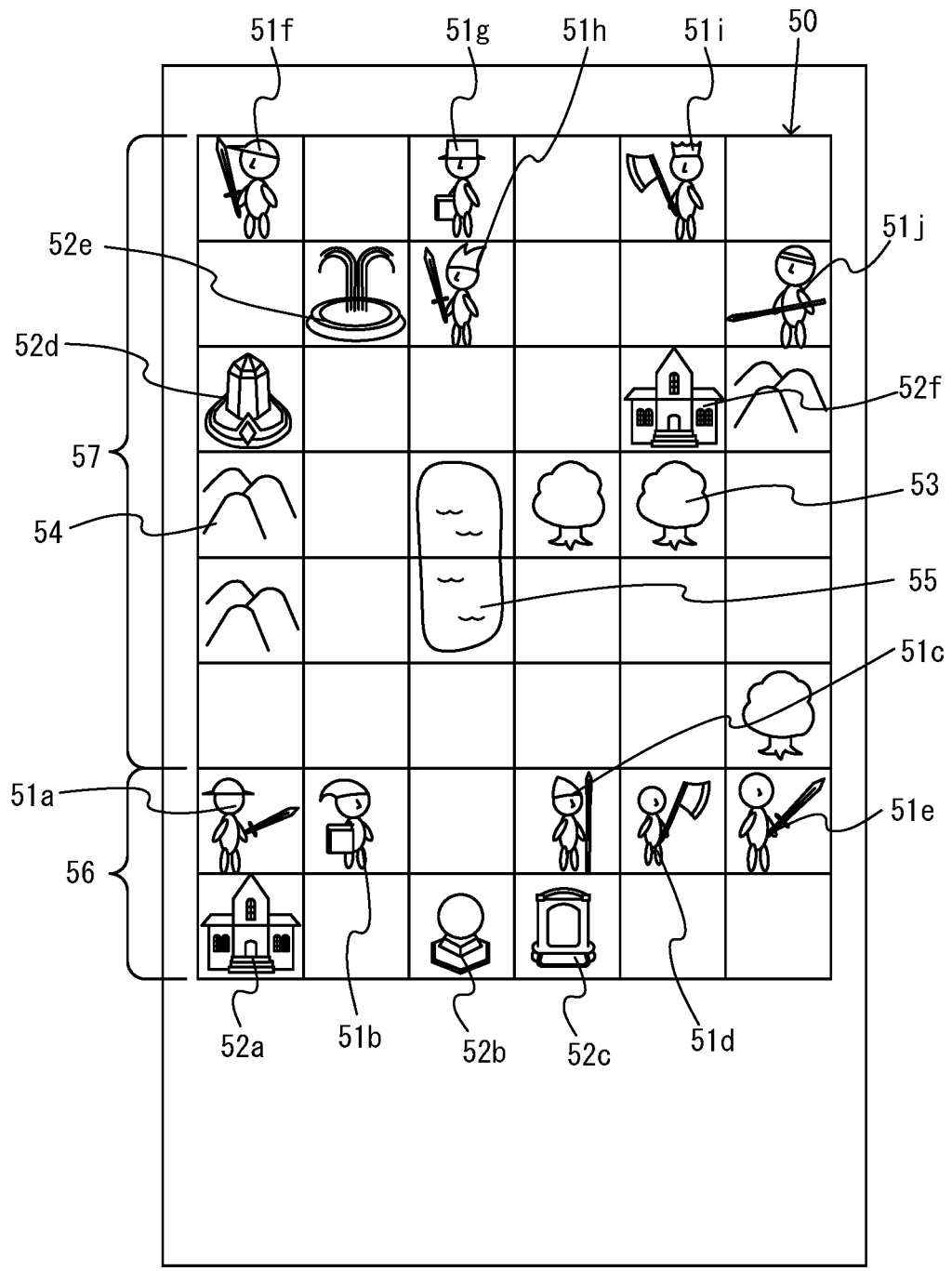
FIG. 5 is a diagram showing a non-limiting example of a game image in a battle game.

FIG. 5 is a diagram showing a non-limiting example of a game image in a battle game. As shown in FIG. 5, the game image includes an image of a game map 50. In the battle game of the present embodiment, a character of the user who has given an instruction to start the battle game (i.e., the user of the terminal apparatus 2, which is also hereinafter referred to as an "attacking user") fights with a character of an opposing user (also hereinafter referred to as a "defending user") on the game map 50.

In the present embodiment, on the game map 50, characters (characters 51*a*-51*j* shown in FIG. 5) and facilities (facilities 52*a*-52*f* shown in FIG. 5) of users are disposed. As an example, on the game map 50, unit regions (also referred to as "cells") in which a character or facility can be disposed are set and arranged in a grid pattern. In the present embodiment, the unit regions on the game map 50 are arranged in a matrix of eight rows and six columns. Note that the characters 51*a*-51*j* disposed on the game map 50 include two distinct types of characters, i.e., the attacking user's characters (referred to as "offensive characters") 51*a*-51*e* and the defending user's characters (referred to as "defensive characters") 51*f*-51*j*. The facilities 52*a*-52*f* disposed on the game map 50 include two distinct types of facilities, i.e., the attacking user's facilities (referred to as "offensive facilities") 52*a*-52*c* and the defending user's facilities (referred to as "defensive facilities") 52*d*-52*f*.

Facilities are a game object that has an influence on a character on the game map 50. For example, a facility may have the function of damaging a character disposed within a predetermined range with reference to that facility, and the function of allowing the character to recover the physical strength thereof. A facility may also have the function of enhancing or reducing an ability of a character disposed within a predetermined range with reference to that facility. Note that an offensive facility may have an influence only on offensive characters or only on defensive characters, and a defensive facility may have an influence only on defensive characters or only on offensive characters.

As shown in FIG. 5, the game map 50 includes a terrain object (e.g., a tree object 53, a mountain object 54, a lake object 55, etc.). For example, there may be some terrain objects into which all or some types of characters are forbidden to enter. For example, characters categorized as a foot soldier are forbidden to enter the lake object 55. In the present embodiment, the information processing system prepares a plurality of game maps having different terrains (i.e., different arrangement patterns of terrain objects).

As shown in FIG. 5, the game map 50 includes an offense area 56 and a defense area 57. In the present embodiment, the bottom two rows of the game map 50 correspond to the offense area 56, and the top six rows correspond to the defense area 57. In the offense area 56, offensive characters and offensive facilities can be disposed during the start of a battle game. More specifically, offensive characters can be disposed in the upper row in the offense area 56, and offensive facilities can be disposed in the lower row in the offense area 56. In the defense area 57, defensive characters and defensive facilities can be disposed during the start of a battle game. More specifically, defensive facilities can be disposed in the defense area 57, and defensive characters can be disposed in the top two rows in the defense area 57.

In the present embodiment, the user previously records a disposition of an offensive facility that is used when the user plays as an attacking user (e.g., before the start of a vs-human game or a non-vs-human game). When a vs-human game is started with the user playing as an attacking user, an offensive facility is disposed according to the above record. Note that in the above case, a disposition of an offensive character is set by the attacking user before the start of a battle game.

The user also previously records a disposition of a defensive character, a disposition of a defensive facility, and a terrain in a game map that are used when the user plays as a defending user. When a vs-human game is started with the user playing as a defending user, a disposition of a defensive character, a disposition of a defensive facility, and a terrain in a game map are determined according to the above records. Therefore, in the non-limiting example of FIG. 5, the information processing system determines a disposition of an offensive facility according to records made by the user of the terminal apparatus 2 as an attacking user, and determines a disposition of a defensive character, a disposition of a defensive facility, and a terrain in a game map according to records made by another user as an opponent.

In the present embodiment, when a battle game is started, the information processing system performs a process of allowing the attacking user to operate an offensive character (specifically, to move an offensive character on a game map, to attack a defensive character, etc.) and a process of operating a defensive character by the information processing system itself, by turns one after the other, so that the battle game proceeds. If a predetermined condition for ending the battle game is satisfied, the information processing system ends the battle game. Note that the condition for ending a battle game is not particularly limited. In the present embodiment, the condition is such that a predetermined number of turns (e.g., seven turns) have been finished or all offensive characters or all defensive characters have been beaten. In the present embodiment, if all defensive characters have been beaten, the attacking user wins a victory, and if a predetermined number of turns have been finished or all offensive characters have been beaten, the defending user wins a victory.

When a battle game ends, the information processing system updates the user's score according to a result of the game. In the present embodiment, if the attacking user wins a victory, the information processing system increases the attacking user's score. For example, the increase in score is determined based on a maximum increase and the number of offensive characters beaten in a battle game. Specifically, the maximum increase is determined based on offensive characters used in a battle game. More specifically, if a bonus character or a specific type of offensive character is among offensive characters used in a battle game, a greater maximum increase is provided. The increase in score is calculated by subtracting, from the maximum increase, a reduction depending on the number of beaten offensive characters. Note that the reduction is calculated such that the reduction increases with an increase in the number of beaten offensive characters (e.g., calculated as a value obtained by multiplying the number of beaten offensive characters by a predetermined value).

If the attacking user wins a victory (i.e., the defending user's loss), the information processing system decreases the defending user's score. For example, the decrease in score is determined based on a maximum decrease and the number of offensive characters beaten in a battle game. Specifically, the maximum decrease is determined based on defensive characters used in the battle game. More specifically, if a specific type of defensive character is among defensive characters used in a battle game, a smaller maximum decrease is provided. The decrease in score is calculated by subtracting, from the maximum decrease, a reduction depending on the number of beaten offensive characters. Note that the reduction is calculated such that the reduction increases with an increase in the number of beaten offensive characters (e.g., calculated as a value obtained by multiplying the number of beaten offensive characters by a predetermined value).

If the attacking user loses a battle game, the information processing system does not change the attacking user's score. Note that in this case, the information processing system does not change the defending user's score. Note that in another non-limiting example embodiment, in the above case, the information processing system may decrease the attacking user's score, and may increase the defending user's score.

Note that the method of updating the score based on a game result (i.e., changing the score) is not particularly limited. For example, in another non-limiting example embodiment, the increase in score that occurs if the user wins a vs-human game may be invariable, and the decrease in score that occurs if the user loses a vs-human game may be invariable. Alternatively, in another non-limiting example embodiment, the information processing system may decrease the attacking user's score if the attacking user loses a vs-human game, or may increase the defending user's score if the defending user wins a vs-human game.

Thus, in the present embodiment, the user can increase its own score by playing and winning a vs-human game. Meanwhile, the user's score decreases if the user loses a vs-human game performed by another user. Note that the user does not know when another user performs a vs-human game (i.e., a vs-human game in which the above defense-side battle game is performed). For example, the user's score may be frequently decreased as a result of such a vs-human game being frequently performed, i.e., the user's score may decrease significantly without the user's knowledge. Therefore, in order to reduce such possibility, the information processing system may not decrease the user's score, even if, when another user has played a vs-human game, the second user plays the next vs-human game before a predetermined time (e.g., 20 hours) has passed, and the user loses that game.

After the score is thus updated, the information processing system ends a vs-human game. At this time, if a condition is satisfied, the information processing system gives the above play reward to the user. Specifically, if the user has played a vs-human game or a non-vs-human game for the first time in a day, the user is given a play reward. Note that it is assumed that a play reward is given to the attacking user in a vs-human game, but not to the defending user.

[2-3. Non-Vs-Human Game]

Figure 6:
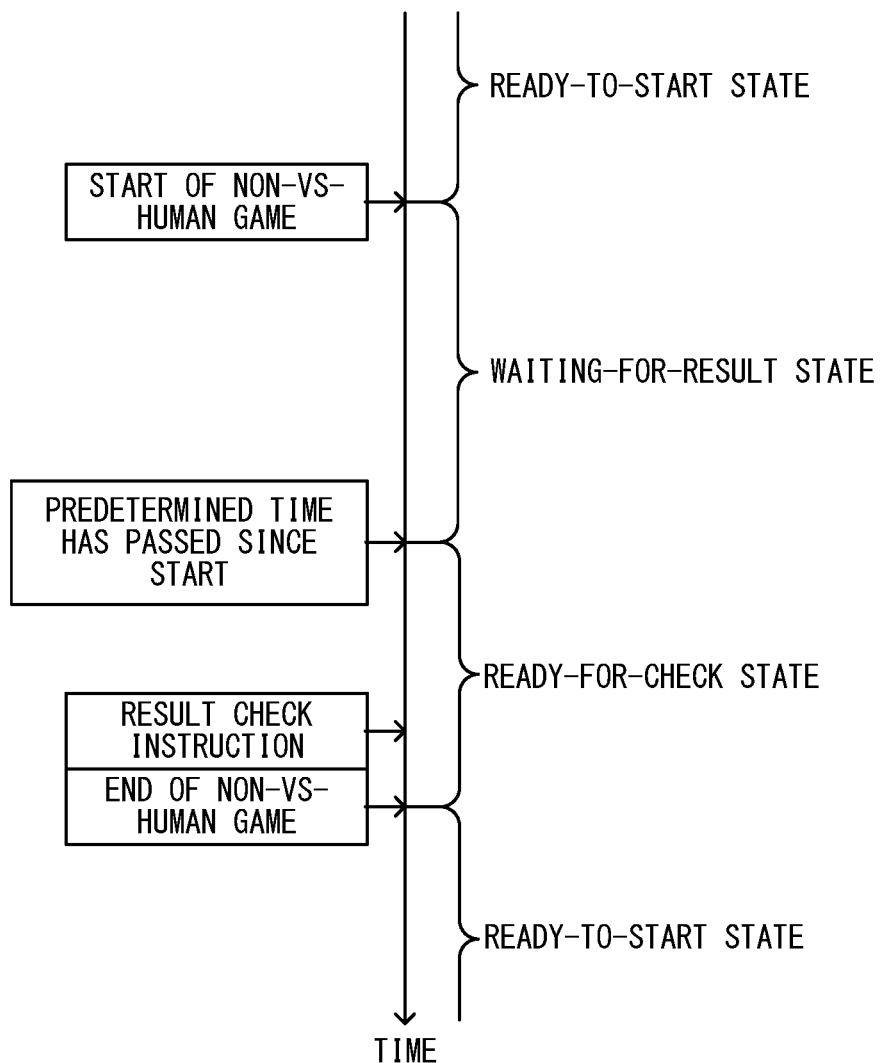
FIG. 6 is a diagram showing a non-limiting example of a flow of a non-vs-human game.

Next, a non-vs-human game will be described. FIG. 6 is a diagram showing a non-limiting example of a flow of a non-vs-human game. In the present embodiment, unlike in a vs-human game, in a non-vs-human game, a game result is obtained after a predetermined time has passed, but not immediately after the start of the game. Specifically, in a non-vs-human game, the user is allowed to check a game result (i.e., a game result of a battle game in the non-vs-human game) after a predetermined time (e.g., 20 hours) has passed since the start of the game. In the present embodiment, after a predetermined time has passed since the start of a game, the user is notified of a game result in response to the user's instruction to check the result, and the non-vs-human game ends (see FIG. 6).

As shown in FIG. 6, in the present embodiment, execution states of a non-vs-human game include a ready-to-start state, a waiting-for-result state, and a ready-for-check state. The ready-to-start state refers to a state in which a non-vs-human game is allowed to start, and in other words, a non-vs-human game is not being executed. The waiting-for-result state refers to a state that occurs after the start of a non-vs-human game and in which a game result of a battle game in the non-vs-human game cannot be checked. Specifically, the execution state of a non-vs-human game is the waiting-for-result state during the period from the start of the non-vs-human game until the above predetermined time has passed. The ready-for-check state refers to a state in which a game result of a battle game in a non-vs-human game can be checked. Specifically, the execution state of a non-vs-human game is the ready-for-check state during the period from the time the above predetermined time has just passed since the start of the non-vs-human game until the end of the non-vs-human game.

Figure 7:
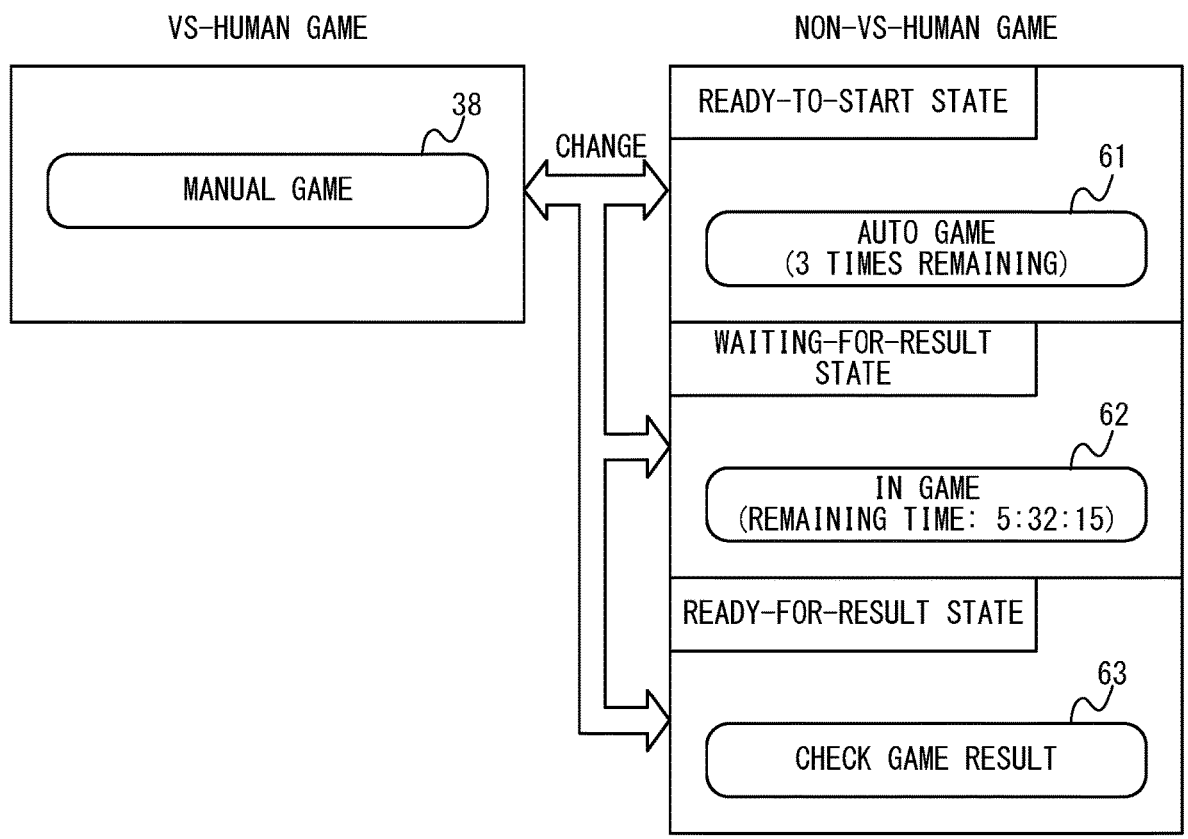
FIG. 7 is a diagram showing a non-limiting example of changing of a vs-human game button and a non-vs-human game button in a selection image.

In a non-vs-human game, the user initially causes the non-vs-human game button to be displayed in the selection image on the display section 24 instead of the vs-human game button 38. FIG. 7 is a diagram showing a non-limiting example of changing of the vs-human game button and the non-vs-human game button in the selection image. As shown in FIG. 7, when the user gives input to the change button 39 while the vs-human game button 38 is being displayed (see FIG. 5), the terminal apparatus 2 displays the non-vs-human game button on the display section 24 instead of the vs-human game button 38.

In the present embodiment, the display form of the non-vs-human game button is changed depending on the execution state of a non-vs-human game. Specifically, as shown in FIG. 7, as the non-vs-human game button, one of images 61-63 is displayed, corresponding to the execution state of a non-vs-human game. Note that when the user gives input to the change button 39 while the non-vs-human game button is being displayed, the terminal apparatus 2 displays the vs-human game button 38 on the display section 24 instead of the non-vs-human game button (see FIG. 7).

As shown in FIG. 7, when the execution state of a non-vs-human game is the ready-to-start state, a game execution button 61 is displayed as the non-vs-human game button. Note that in the present embodiment, in a non-vs-human game, the user does not perform a game operation in a battle game, and therefore, the game execution button 61 of FIG. 7 is denoted by "AUTO GAME."

Here, in the present embodiment, the information processing system sets an upper limit on the number of times the user can perform a non-vs-human game during the above game period that a game can be performed in the score acquisition mode. For example, the upper limit of the number of times a non-vs-human game can be performed during a single game period is set to three. Note that in the present embodiment, the terminal apparatus 2 displays the game execution button 61 including the remaining number of times in order to notify the user of the remaining number of times a non-vs-human game can be performed (see FIG. 7).

If the number of times a non-vs-human game has been performed during the current game period has reached the upper limit, the terminal apparatus 2 is no longer permitted to receive the user's input to the game execution button 61. Although not shown, the terminal apparatus 2 displays the game execution button 61 indicating that the remaining number of times is zero, in order to allow the user to recognize whether or not a non-vs-human game can be executed.

When receiving the user's input to the game execution button 61, the information processing system specifies a consumption magnification factor for the energy value and a set of characters according to the user's instruction before the start of a non-vs-human game. In the present embodiment, the user specifies a consumption magnification factor for the energy value and a set of characters by giving input to a preparation image. When receiving the user's input to the game execution button 61, the terminal apparatus 2 displays the preparation image on the display section 24.

Figure 8:
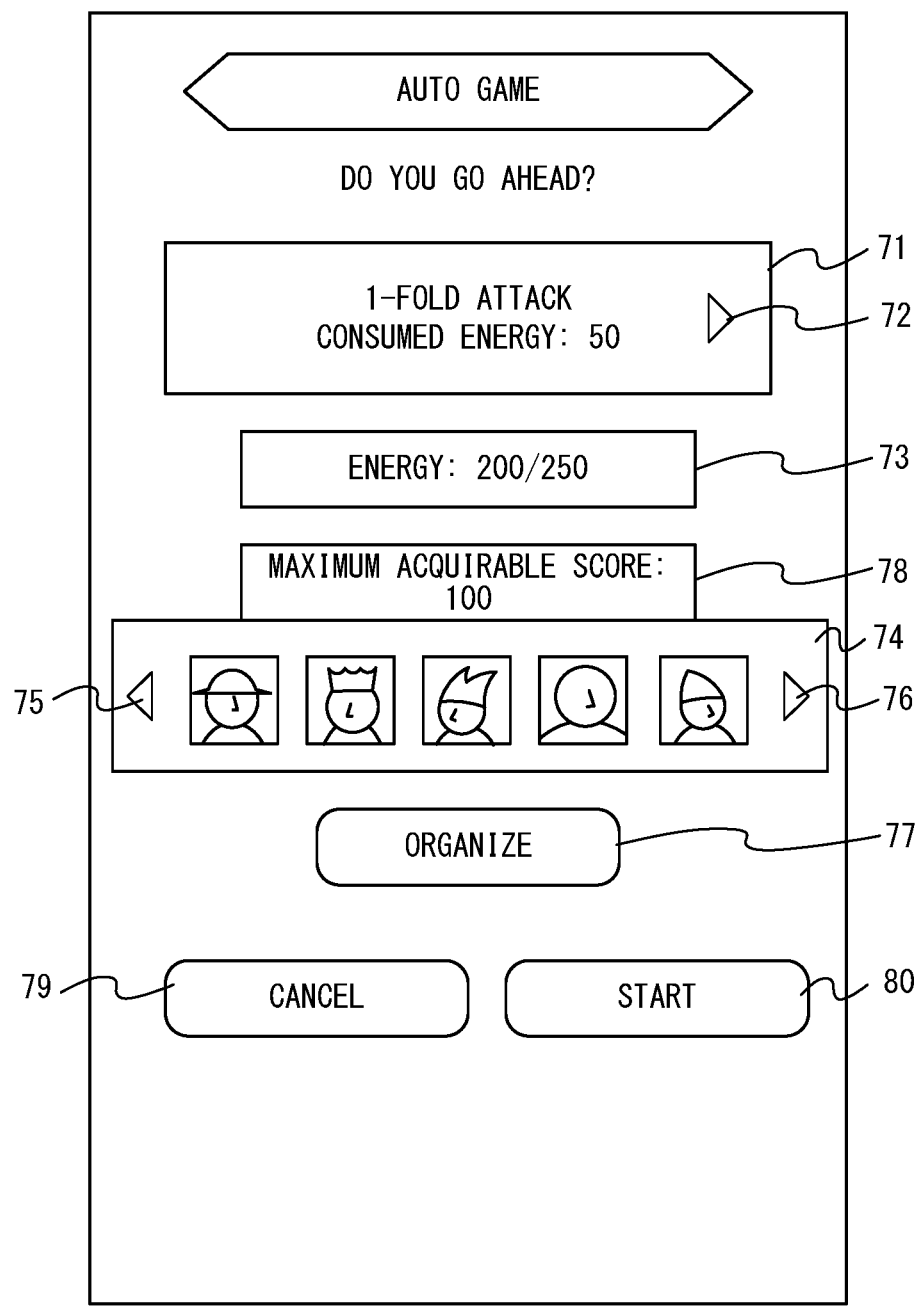
FIG. 8 is a diagram showing a non-limiting example of a preparation image.

FIG. 8 is a diagram showing a non-limiting example of the preparation image. In a situation that the preparation image is displayed, the user specifies a consumption magnification factor and a set of characters, and thereafter, gives an instruction to start, whereby a non-vs-human game is started.

The preparation image includes a magnification factor specification image 71 for allowing the user to specify a consumption magnification factor. The magnification factor specification image 71 indicates a consumption magnification factor being selected (1-fold in FIG. 8), and an energy value that is consumed when the consumption magnification factor is applied. The magnification factor specification image 71 also includes a change button 72. In response to input to the change button 72, the terminal apparatus 2 changes the consumption magnification factor indicated by the magnification factor specification image 71. In the present embodiment, in response to input to the change button 72, the consumption magnification factor is changed between 1-fold and 2-fold. The preparation image also includes an energy value image 73 similar to the energy value image 35 included in the selection image.

The preparation image includes a character set image 74 for allowing the user to specify a set of characters. The character set image 74 indicates a set of characters being selected (a set of five characters in FIG. 8). Note that in the present embodiment, it is assumed that up to five offensive characters can be caused to appear in a battle game in a vs-human game and a non-vs-human game. The character set image 74 also includes change buttons 75 and 76. In response to input to the change button 75 or 76, the terminal apparatus 2 changes the set of characters being selected that is indicated by the character set image 74. In the present embodiment, a plurality of sets recorded by the user have been numbered. The terminal apparatus 2 changes the set being selected in a predetermined order in response to input to the change button 75, and changes the set being selected in the opposite order to the predetermined order in response to input to the change button 76.

The preparation image also includes an organization button 77 for giving an instruction to organize and change details of a character set (i.e., characters in a set). In the present embodiment, when input is given to the organization button 77, the terminal apparatus 2 displays an organization image for changing details of a recorded character set, and while the organization image is being displayed, changes details of the character set according to the user's instruction. Thus, in the present embodiment, the user can change details of a character set on the stage that the preparation image is being displayed.

The preparation image includes a maximum acquirable score image 78. The maximum acquirable score image 78 indicates a maximum score that can be acquired by the user when the consumption magnification factor being selected that is indicated by the magnification factor specification image 71 is applied, and the set being selected that is indicated by the character set image 74 is used in a non-vs-human game. For example, the user can select a character set with which as great a score as possible could be acquired, by checking the maximum acquirable score image 78.

The preparation image also includes an end button 79 for ending displaying of the preparation image. Specifically, when the user gives input to the end button 79, the terminal apparatus 2 ends displaying of the preparation image, and displays the above selection image.

The preparation image includes a start button 80 for giving an instruction to start a non-vs-human game. Specifically, when the user gives input to the start button 80, the terminal apparatus 2 starts a non-vs-human game. Note that the user specifies a consumption magnification factor and a set of characters, which are in turn being selected as desired ones, by giving input to the change buttons 72, 75, and 76 and the organization button 77 as appropriate, before giving input to the start button 80.

Note that like a vs-human game, a non-vs-human game is allowed to be executed under a condition that an energy value set for the user is at least the reference consumption amount. Therefore, if the current energy value is less than a consumption amount calculated from the consumption magnification factor specified by the user (i.e., the energy value indicated by the magnification factor specification image 71), the terminal apparatus 2 does not start a non-vs-human game even when receiving an instruction to start (or the terminal apparatus 2 may not be permitted to receive an instruction to start). In this case, the terminal apparatus 2 notifies the user that the energy value is not great enough for the user to perform a non-vs-human game.

As described above, in the present embodiment, the information processing system decreases a predetermined parameter (i.e., an energy value) in response to execution of a vs-human game or non-vs-human game. If the predetermined parameter is less than a first value (e.g., the reference consumption amount), the execution of a vs-human game is limited, and if the predetermined parameter is less than a second value (e.g., the reference consumption amount), the execution of a non-vs-human game is limited. This inhibits the user from playing a vs-human game and a non-vs-human game without limitation, and therefore, the user is driven to increase the score by playing a game a limited number of times, resulting in an improvement in the strategic aspect and amusingness of a game in which a score is acquired. In addition, because the same parameter is used for both of a vs-human game and a non-vs-human game, the user can select allocations between the two types of games in the present embodiment. This can also improve the strategic aspect of a game in which a score is acquired. Although it is assumed in the present embodiment that the first and second values are equal, the first and second values may be different in another non-limiting example embodiment.

As described above, in the present embodiment, a game result of a non-vs-human game is obtained after a predetermined time has passed since the start of the game (see FIG. 6). Therefore, when a non-vs-human game is started by input to the start button 80, the terminal apparatus 2 does not immediately display a game image of a battle game (unlike vs-human games), and instead, displays the selection image. At this time, the execution state of the non-vs-human game is the above waiting-for-result state, and therefore, a waiting button 62 is displayed as the non-vs-human game button in the selection image (see FIG. 7).

Note that as described below, in a non-vs-human game, the above play reward is given to the user in response to the start of the non-vs-human game triggered by input to the start button 80 (if a condition is satisfied). Therefore, when the play reward is given to the user, the terminal apparatus 2 displays, on the display section 24, a notification indicating that the play reward has been given to the user, and thereafter, displays the selection image.

As shown in FIG. 7, the waiting button 62 indicates a time remaining until the above predetermined time has passed since the start of a non-vs-human game. This allows the user to confirm the time remaining until the user can check a game result of the non-vs-human game. Note that the terminal apparatus 2 is not permitted to receive input to the non-vs-human game button during the period that the waiting button 62 is being displayed as the non-vs-human game button (in other words, in the waiting-for-result state).

When the above predetermined time has passed since the start of a non-vs-human game, the execution state of the non-vs-human game transitions to the ready-for-check state, in which the terminal apparatus 2 displays a check instruction button 63 as the non-vs-human game button (see FIG. 7). The check instruction button 63 is a button image for giving the above result check instruction to check a game result of a non-vs-human game.

Note that the information processing system may notify the user that the execution state of a non-vs-human game has transitioned to the ready-for-check state. For example, if the above predetermined time has passed since the start of a non-vs-human game during the period that the game application is not active, the terminal apparatus 2 may notify the user at the timing that the game application is subsequently activated.

When input is given to the check instruction button 63 included in the selection image, the information processing system calculates a game result of a non-vs-human game, and presents the game result to the user. In the present embodiment, in the above case, the terminal apparatus 2 initially displays a game image in a battle game on the display section 24. This game image is a game map that is similar to that which is displayed in a battle game in a vs-human game, and in which characters (i.e., an offensive character and a defensive character) and facilities (i.e., an offensive facility and a defensive facility) are disposed (see FIG. 5).

Note that as described above, in a non-vs-human game, game data related to other users are not used. Specifically, in a battle game in a non-vs-human game, the information processing system executes a game process for the battle game using game data prepared by the information processing system itself. Specifically, the information processing system sets the types of a defensive character, defensive facility, and game map using a predetermined method, and executes a battle game using the set game map, defensive character, and defensive facility. The above predetermined method is not particularly limited. For example, the game map may be set using a method of randomly selecting one from a plurality of previously prepared game maps.

In addition, in the present embodiment, the information processing system sets a defensive character that is used in a battle game in a non-vs-human game to be more easily weakened than is a defensive character of another user in a vs-human game. In the present embodiment, the information processing system sets, as a defensive character, a character having a level that is not maximum, or a character having weak equipment and/or skill. Note that the weak equipment (or skill) refers to a piece of equipment (or skill) that is not the strongest of a plurality of types of prepared equipment (or skills) having different powers. For example, if it is assumed that another user uses, as a defensive character, a character having a highest level and/or a character having a strongest piece of equipment and/or skill, a defensive character in a non-vs-human game can be set to be weaker than a defensive character in a vs-human game as described above. Thus, in the present embodiment, the difficulty of a non-vs-human game is set to be lower than the difficulty of a vs-human game.

Note that in the present embodiment, based on the strength of the user of the terminal apparatus 2 (specifically, the score and/or ranking of the user), the information processing system determines another user who is an opponent in a vs-human game. For example, the information processing system selects and determines another user who is an opponent from other users having a ranking similar to that of the user of the terminal apparatus 2. Therefore, in a vs-human game, the strength of a defensive character varies depending on the strength of the user themselves. In contrast to this, the information processing system sets a defensive character in a non-vs-human game independently of the strength of the user of the terminal apparatus 2 (specifically, based on the same criterion for each user). Specifically, in the present embodiment, the opponent in a vs-human game varies depending on the strength of the user themselves, and the opponent in a non-vs-human game is set to have a predetermined strength that can be dealt with by the user even when the user has a low score or ranking. Thus, it can be said that the difficulty of a non-vs-human game is more easily set to be lower than the difficulty of a vs-human game.

Note that in another non-limiting example embodiment, the information processing system may set a defensive character in a non-vs-human game based on the user's score and/or ranking. In that case, like in the present embodiment, the information processing system may set a defensive character in a non-vs-human game to be more easily weaken than is another user's defensive character in a vs-human game.

The information processing system may randomly select a defensive facility that is to be used in a battle game in a non-vs-human game from prepared defensive facilities, and may randomly dispose the selected defensive facility on a game map. Note that in the present embodiment, the information processing system does not dispose a specific type of defensive facility of the prepared defensive facilities (described in detail below).

Note that as an offensive character that is used in a battle game in a non-vs-human game, a set of characters specified by the user in the above preparation image are used. Note that the disposition of an offensive character on a game map is not particularly limited. For example, offensive characters may be disposed in a predetermined order or at random in an area in a game map where an offensive character can be disposed. An offensive facility that is used in a battle game in a non-vs-human game is disposed according to a record that has been made by the user, like in a vs-human game.

The information processing system executes a battle game in a non-vs-human game using a game map on which a character and a facility have been set as described above. Here, as described above, in a battle game in a non-vs-human game, neither an offensive character nor a defensive character is operated by the user. Specifically, in a battle game in a non-vs-human game, the information processing system operates both an offensive character and a defensive character so that the battle game proceeds.

In the present embodiment, the terminal apparatus 2 displays, on the display section 24, how a battle game proceeds from the start to end thereof. This allows the user to check the behavior of each character in the battle game in addition to a game result of the battle game. Note that in another non-limiting example embodiment, the terminal apparatus 2 may present only a game result to the user without presenting how a battle game proceeds.

When a battle game in a non-vs-human game ends, the information processing system updates the user's score based on a game result of the battle game. In the present embodiment, the increase in score in a non-vs-human game is calculated by multiplying a base value calculated by a calculation method similar to that for a vs-human game by a predetermined coefficient (e.g., 75%) to be smaller than the base value. Thus, in the present embodiment, the score that can be acquired in a non-vs-human game is smaller than when the same game result is achieved in a vs-human game.

After updating a score, the information processing system ends a non-vs-human game, and the terminal apparatus 2 displays the selection image on the display section 24. At this time, the execution state of the non-vs-human game is the ready-to-game state, and therefore, the selection image including the above the game execution button 61 as the non-vs-human game button is displayed.

As described above, in the present embodiment, in the score acquisition mode in which a score can be acquired in a vs-human game, the user can acquire a score even in a non-vs-human game. This allows a user having such a play style that the user does not tend to perform a vs-human game to participate in the score acquisition mode, and therefore, users having various play styles can be dealt with. For example, in the present embodiment, a user who does not tend to participate in the score acquisition mode, for example, since that user is not good at or does not like a vs-human game, can be motivated to participate in the score acquisition mode.

In addition, in the present embodiment, in a non-vs-human game, the user does not need to perform a game operation (specifically, a game operation in a battle game), and therefore, can light-heartedly perform a non-vs-human game. This allows the user to more easily participate in the score acquisition mode. For example, a non-vs-human game can be more easily performed than in the vs-human mode, and therefore, the user can more easily participate in the score acquisition mode even when the user does not have much time to perform a vs-human game.

In addition, in the present embodiment, the information processing system sets the difficulty of a non-vs-human game to be more likely to become lower (or to be lower) than the difficulty of a vs-human game. This allows a user who has difficulty in winning a vs-human game to acquire a score by performing a non-vs-human game. Therefore, the possibility that a user who cannot very frequently win a vs-human game hesitates to participate in the score acquisition mode can be reduced.

Here, if the user mostly performs a non-vs-human game, so that the number of times a vs-human game is performed decreases, the number of times a defense-side battle game is performed by another user performing a vs-human game decreases. Therefore, the amusingness of the score acquisition mode, which is partially aimed to competition with another user for a higher score, is likely to decrease. Therefore, in the present embodiment, the information processing system is modified as follows in terms of non-vs-human games so as to avoid the situation that a non-vs-human game is mostly performed and a vs-human game is not very often performed.

As described above, in the present embodiment, the increase in score in a non-vs-human game is calculated to be smaller than a base value calculated by a method similar to that for a vs-human game (e.g., by multiplying the base value by a predetermined coefficient). Thus, the information processing system, when obtaining a game result of a non-vs-human game, updates the user's score based on such a calculation method that the increase in the score is smaller than when the same game result is obtained in a vs-human game. This motivates the user to perform a vs-human game, so that the possibility that a non-vs-human game is mostly performed can be reduced.

Note that the "game result" refers to a game result that has an influence on a change in a score. The "same game result between a non-vs-human game and a vs-human game" means that some part of a game result that has an influence on a change in a score is the same, but not that the game results of a non-vs-human game and a vs-human game are exactly the same. For example, in the present embodiment, the "number of beaten offensive characters" is a game result that has an influence on a score, and the "type of a beaten offensive character" does not have an influence on a score. Here, the "number of beaten offensive characters" corresponds to the above "game result," and it can be said that a vs-human game and a non-vs-human game have the same game result even when the "type of a beaten offensive character" is different.

In the present embodiment, it takes at least the above predetermined time (e.g., 20 hours) to complete a non-vs-human game, i.e., the time from the start to end of the game is greater than or equal to the above predetermined time. Specifically, the information processing system starts a non-vs-human game in response to selection of a non-vs-human game (e.g., input is given to the game execution button 61 in the selection image), and the user's score is updated based on a game result that is determined after the predetermined time has passed since the start of the non-vs-human game. At this time, the information processing system limits execution of the next non-vs-human game until the above predetermined time has passed since the start of the current non-vs-human game. This limits repeated execution of a non-vs-human game by the user during a short time, and therefore, the possibility that a non-vs-human game is mostly performed can be reduced. In the present embodiment, the user who performs a non-vs-human game activates the game application at two timings, i.e., when a non-vs-human game is started and when a game result of the non-vs-human game is checked. Therefore, the opportunities for the user to activate the game application can be increased.

Note that after the above predetermined time has passed since the start of a non-vs-human game, the information processing system presents a game result to the user in response to the user's predetermined operation (i.e., an operation of giving input to the check instruction button 63). This allows the user to check a game result at a desired timing, resulting in an improvement in the user's convenience.

Note that in the present embodiment, the information processing system calculates a game result of a non-vs-human game after the above predetermined time has passed since the start of the non-vs-human game. Here, in another non-limiting example embodiment, the information processing system may calculate a game result of a non-vs-human game before the above predetermined time has passed since the start of the non-vs-human game (e.g., immediately after the start). At this time, the information processing system may be permitted to receive an instruction to check a game result after the above predetermined time has passed since the start of the non-vs-human game. In that case, like in the present embodiment, a game result can be presented to the user after the above predetermined time has passed since the start of the non-vs-human game. Note that at this time, the terminal apparatus 2 may replay or play back a battle game related to the game result that has already been calculated, in response to an instruction to check the game result.

In the present embodiment, as described above, the information processing system sets an upper limit on the number of times the user can perform a non-vs-human game during the above game period that a game can be performed in the score acquisition mode. Specifically, in the present embodiment, the information processing system limits the number of times a non-vs-human game can be executed during a predetermined time (also referred to as "the number of times of execution"), regardless of the value of a predetermined parameter (i.e., an energy value). For example, the number of times of execution is set to be smaller than the number of times a vs-human game can be performed in exchange of subtraction of the above predetermined parameter. This can limit the number of times the user performs a non-vs-human game during the above period, and therefore, the possibility that a non-vs-human game is mostly performed can be reduced.

In the present embodiment, among the defensive facilities in a vs-human game is a special facility which has a function of recovering the energy value (e.g., a fountain facility). Specifically, in the case where the special facility is disposed as a defensive facility, the information processing system increases the user's energy value by a predetermined increase (e.g., 70) a predetermined time (e.g., a day). When the above special facility, which is a defensive facility, is destroyed by an offensive character in a vs-human game, the attacking user's energy value is increased by a predetermined amount (e.g., 20). Therefore, in a vs-human game, the attacking user can recover their own energy value by destroying the above special facility in addition to the increase of the score by winning a battle game.

In contrast to this, in a battle game in a non-vs-human game, the information processing system does not dispose the above special facility as a defensive facility. Therefore, in a non-vs-human game, the user cannot recover their own energy value. Thus, in the present embodiment, the user is given an opportunity to recover the energy value only in a vs-human game, which motivates the user to perform a vs-human game. Therefore, the possibility that a non-vs-human game is mostly performed can be reduced.

In the present embodiment, among the offensive facilities in a vs-human game is a special facility (e.g., a ladder facility) that has a function of preventing the score from being decreased even when a battle game is lost as long as the number of losses is lower than a predetermined number of times as an upper limit. In contrast to this, in a battle game in a non-vs-human game, the information processing system does not dispose the above special facility as an offensive facility. Note that in the case where the above special facility has been recorded as an offensive facility, the information processing system disposes an offensive facility based on a record, excluding the special facility, in a battle game in a non-vs-human game. Therefore, in the present embodiment, the user can utilize the function of the above special facility only in a vs-human game. This also motivates the user to perform a vs-human game, and therefore, the possibility that a non-vs-human game is mostly performed can be reduced.

[2-4. Non-Limiting Example of Flow in Score Acquisition Mode]

Figure 9:
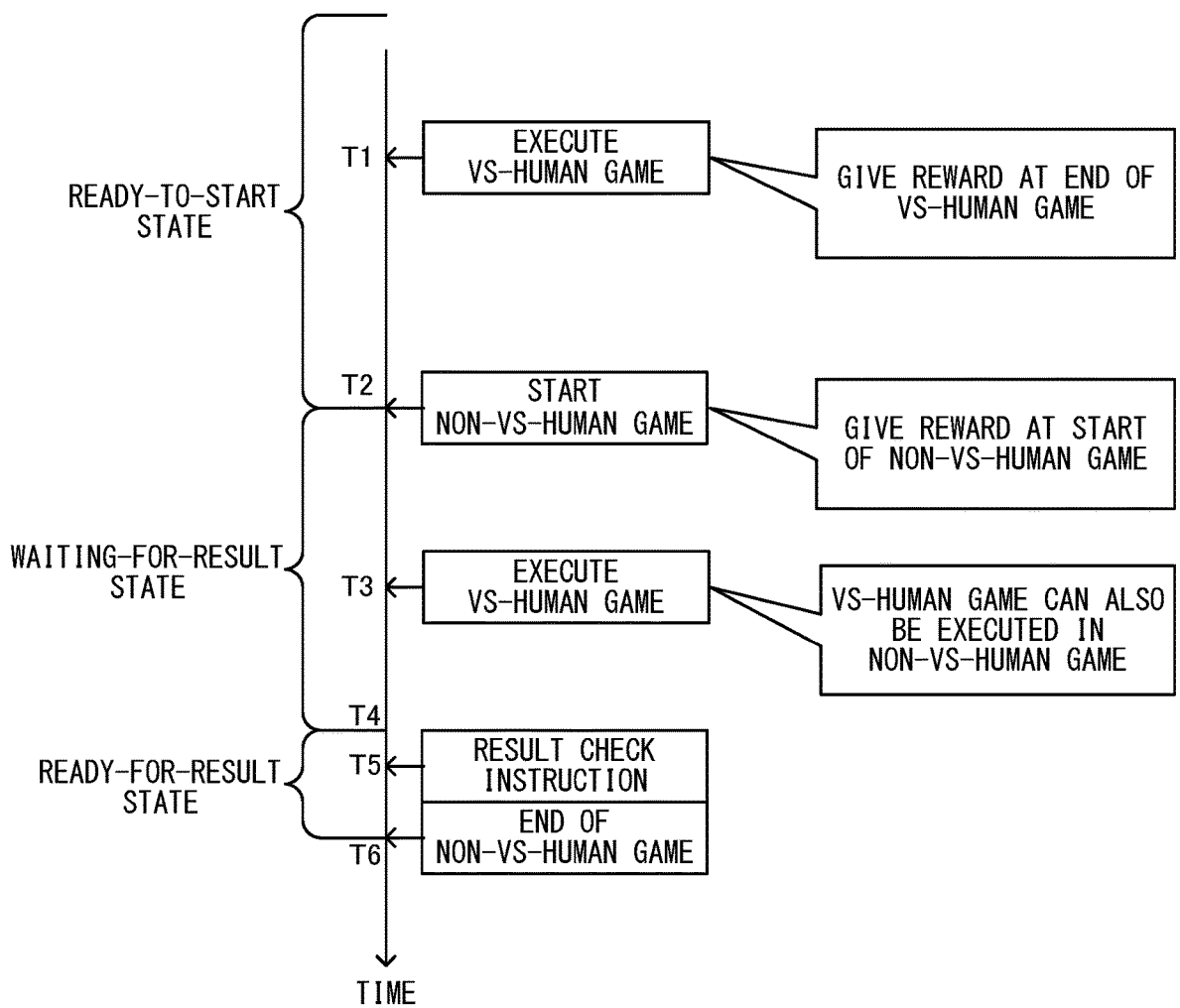
FIG. 9 is a diagram showing a non-limiting example of a flow in which a vs-human game and a non-vs-human game are performed in a score acquisition mode.

FIG. 9 is a diagram showing a non-limiting example of a flow in which a vs-human game and a non-vs-human game are performed in the score acquisition mode. Note that in FIG. 9, a non-limiting example will be described in which a vs-human game is performed before a non-vs-human game is performed, and another vs-human game is performed during that non-vs-human game. Note that in the present embodiment, a vs-human game and a non-vs-human game do not necessarily need to be performed in the order shown in FIG. 9. In the description that follows, a non-limiting example will be described in which a vs-human game and a non-vs-human game are performed in the order shown in FIG. 9.

In the non-limiting example of FIG. 9, at time T1, a vs-human game is performed. Specifically, the information processing system starts a vs-human game in response to selection of the vs-human game (e.g., input is given to the vs-human game button 38 in the selection image). Following this, the information processing system displays a game image of a battle game, receives the user's game operation, and ends the vs-human game in response to determination of a game result based on the user's game operation. Note that in the non-limiting example of FIG. 9, it is assumed that for the above vs-human game, a condition for giving a play reward (i.e., the user has played a vs-human game or non-vs-human game for the first time in a day) (hereinafter referred to as a "reward condition") is satisfied. At this time, the information processing system gives a play reward to the user at the end of the above vs-human game. For example, the terminal apparatus 2 notifies the user of a game result of the vs-human game and a score updated based on the game result, and thereafter, notifies that a play reward has been given, and ends the vs-human game.

In the non-limiting example of FIG. 9, at time T2 after time T1, a non-vs-human game is started (i.e., input is given to the start button 80 in the above preparation image). Here, it is assumed that for the non-vs-human game, the above reward condition is satisfied. At this time, the information processing system gives a play reward to the user in response to the start of the above non-vs-human game. For example, the terminal apparatus 2, when ending displaying of the preparation image, notifies that a play reward has been given, and thereafter, displays the selection image.

As described above, in the present embodiment, the information processing system gives the user a reward in response to the end of a vs-human game or the start of a non-vs-human game under a predetermined condition (i.e., if the reward condition is satisfied). Thus, a reward can be given to the user in a vs-human game without interfering with the proceeding of a game. The user who has started a non-vs-human game can acquire a reward without waiting for the end of the game that occurs after a predetermined time has passed since the start of the game, resulting in an improvement in the user's convenience. Note that if a reward is given at the end of a game in a non-vs-human game like in a vs-human game, the user is likely to have a feeling of unnaturalness because it takes time to end a non-vs-human game unlike a vs-human game, and therefore, the user is not given a reward immediately after the start of a game. In addition, in the case where a play reward is given once a day like in the present embodiment, the date may have changed before the end of a non-vs-human game, and the reward condition may not be satisfied, so that a play reward may not be given. In contrast to this, in the present embodiment, a reward is given in response to the start of a non-vs-human game, and therefore, the above possibility can be reduced.

In the non-limiting example of FIG. 9, at time T3 after time T2, a vs-human game is performed. Although at time T3, the non-vs-human game is being performed (specifically, the waiting-for-result state), the user can perform a vs-human game in the present embodiment. Specifically, in the waiting-for-result state, the user causes the vs-human game button 38 to be displayed in the selection image, and gives input to the vs-human game button 38, thereby performing a vs-human game.

As described above, the information processing system executes a vs-human game in response to selection of the vs-human game even before the above predetermined time has passed since the start of a non-vs-human game. Therefore, the opportunity to perform a vs-human game is less limited by a non-vs-human game, and therefore, the user can perform a vs-human game at a flexible timing. In addition, because a vs-human game can be performed at a flexible timing, the user can perform a non-vs-human game without considering a timing of a vs-human game. Therefore, in the present embodiment, the user more easily starts both a vs-human game and a non-vs-human game at a flexible timing.

Note that in the present embodiment, in a vs-human game performed during a non-vs-human game, a character and a facility that are being used in that non-vs-human game can be used. This allows the user to more easily perform a vs-human game even during a non-vs-human game.

In the non-limiting example of FIG. 9, the execution state of the non-vs-human game transitions to the ready-for-check state at time T4, at which the above predetermined time has just passed since time T2. At time T5 after time T4, in response to the user's result check instruction, the information processing system notifies the user of a game result of the non-vs-human game, and also notifies the user of the updated score, and thereafter, ends the non-vs-human game (time T6).

As described above, in the present embodiment, the user can perform both a vs-human game and a non-vs-human game at a flexible timing during a game period.

[3. Specific Non-Limiting Example of Process In Information Processing System]

Next, a specific non-limiting example of an information process in the information processing system will be described with reference to FIGS. 10-14.

[3-1. Data Used in Information Process]

Figure 10:
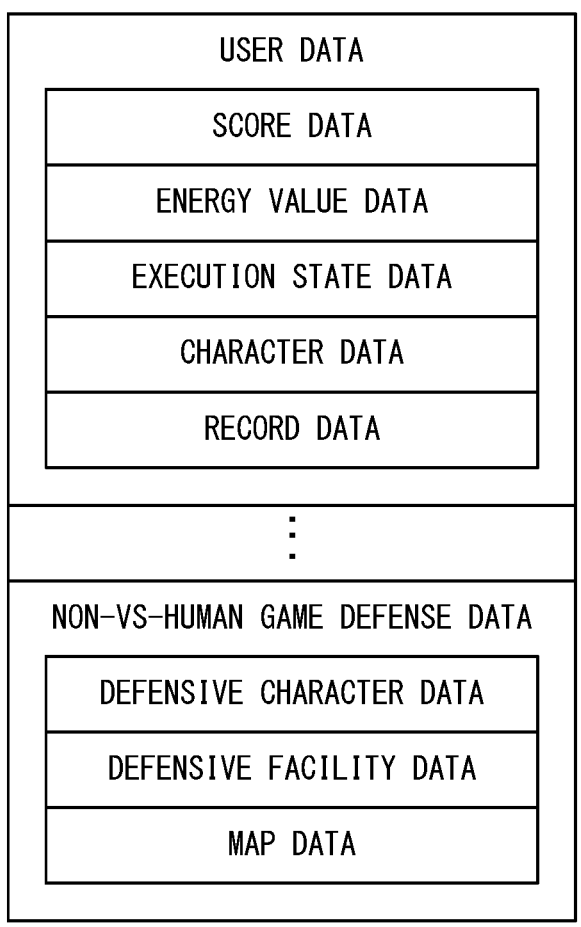
FIG. 10 is a diagram showing non-limiting examples of various types of data that are used in an information process in an information processing system.

FIG. 10 is a diagram showing non-limiting examples of various types of data that are used in an information process in the information processing system. Each type of data of FIG. 10 is stored in, for example, the storage section 12 (or a memory of the processing section 11) of the server 1. Note that here, each type of data of FIG. 10 is previously stored in the server 1 before a series of steps shown in FIGS. 11-14 described below are executed.

As shown in FIG. 10, the server 1 stores user data related to the user of the game application. In the present embodiment, the user data includes score data, energy value data, execution state data, character data, and record data. Note that the server 1 stores the user data for each user in the game application. Note that the user data may include, in addition to the data of FIG. 10, data indicating to a reward given to the user in the game application, and data indicating an item usable by the user.

The score data indicates a score set for the user. In the present embodiment, the score data includes data indicating the user's ranking determined based on the score. The energy value data indicates an energy value set for the user. The execution state data indicates the current execution state of a non-vs-human game.

The character data indicates one or more characters possessed by the user. For example, the character data include data indicating the names, abilities, equipment, etc., of the characters. In the present embodiment, a character that is to be used in a battle game is selected from the characters indicated by the character data. The record data indicates a set of characters, a facility, and a terrain in a game map that have been recorded by the user and are used in the score acquisition mode in each game.

As shown in FIG. 10, the server 1 includes non-vs-human game defense data for setting a defense-side configuration in a non-vs-human game. In the present embodiment, the non-vs-human game defense data includes defensive character data, defensive facility data, and map data.

The defensive character data is for setting a defensive character that is used in a non-vs-human game. The defensive character data may include data indicating a character that is a candidate for a defensive character, or data for generating a defensive character. In the former case, the server 1 sets a defensive character by selecting one that is to be used as a defensive character from candidate characters. In the latter case, the defensive character data includes data for setting details of a character such as data indicating data indicating an appearance of the character, data indicating the ability of the character, and data indicating the equipment and/or skill of the character, and the server 1 sets a defensive character by combining these pieces of data.

The defensive facility data is for setting a defensive facility that is used in a non-vs-human game. The defensive facility data includes, for example, data indicating a facility that is a candidate for a defensive facility. The server 1 sets a defensive facility by selecting one that is to be used as a defensive facility from candidate facilities.

The map data is for setting a game map that is used in a non-vs-human game. The map data includes, for example, data of a plurality of game maps indicating different terrains. The server 1 sets a game map that is used in a non-vs-human game by selecting that from the plurality of game maps indicated by the map data.

Note that in addition to the data of FIG. 10, the server 1 stores a server-side game program. The server-side game program is for executing a game process (a server process shown in FIG. 14) in the server 1. Specifically, a server process described below (see FIG. 14) is executed in the server 1 by the processing section 11 of the server 1 executing the above server-side game program.

The terminal apparatus 2 also stores a terminal-side game program. The terminal-side game program is for executing a game process (a terminal process shown in FIG. 11) in the terminal apparatus 2. Specifically, a terminal process described below (see FIG. 11) is executed in the terminal apparatus 2 by the processing section 21 of the terminal apparatus 2 executing the terminal-side game program.

Note that the terminal apparatus 2 may store all or a portion of various types of data (see FIG. 10) stored in the server 1 for use in execution of the terminal process. Each type of data that is used in the information processing system may be stored in either the server 1 or the terminal apparatus 2. Note that in the case where the same data is stored in the server 1 and the terminal apparatus 2, data stored in the server 1 and data stored in the terminal apparatus 2 are synchronized at an appropriate timing.

[3-2. Process in Terminal Apparatus]

Figure 11:
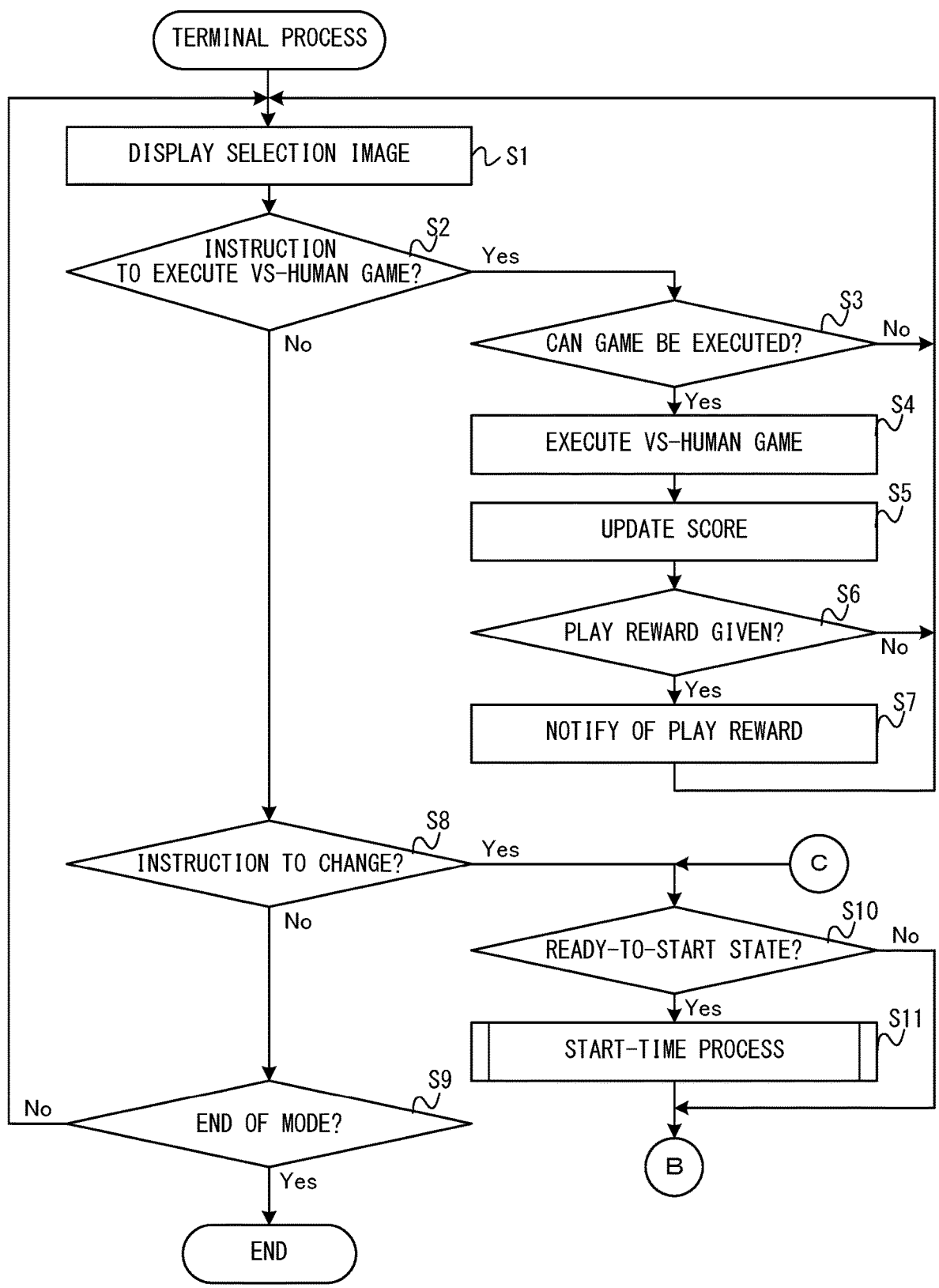
FIG. 11 is a flowchart showing a non-limiting example of a flow of a terminal process that is executed by a terminal apparatus.
Figure 12:
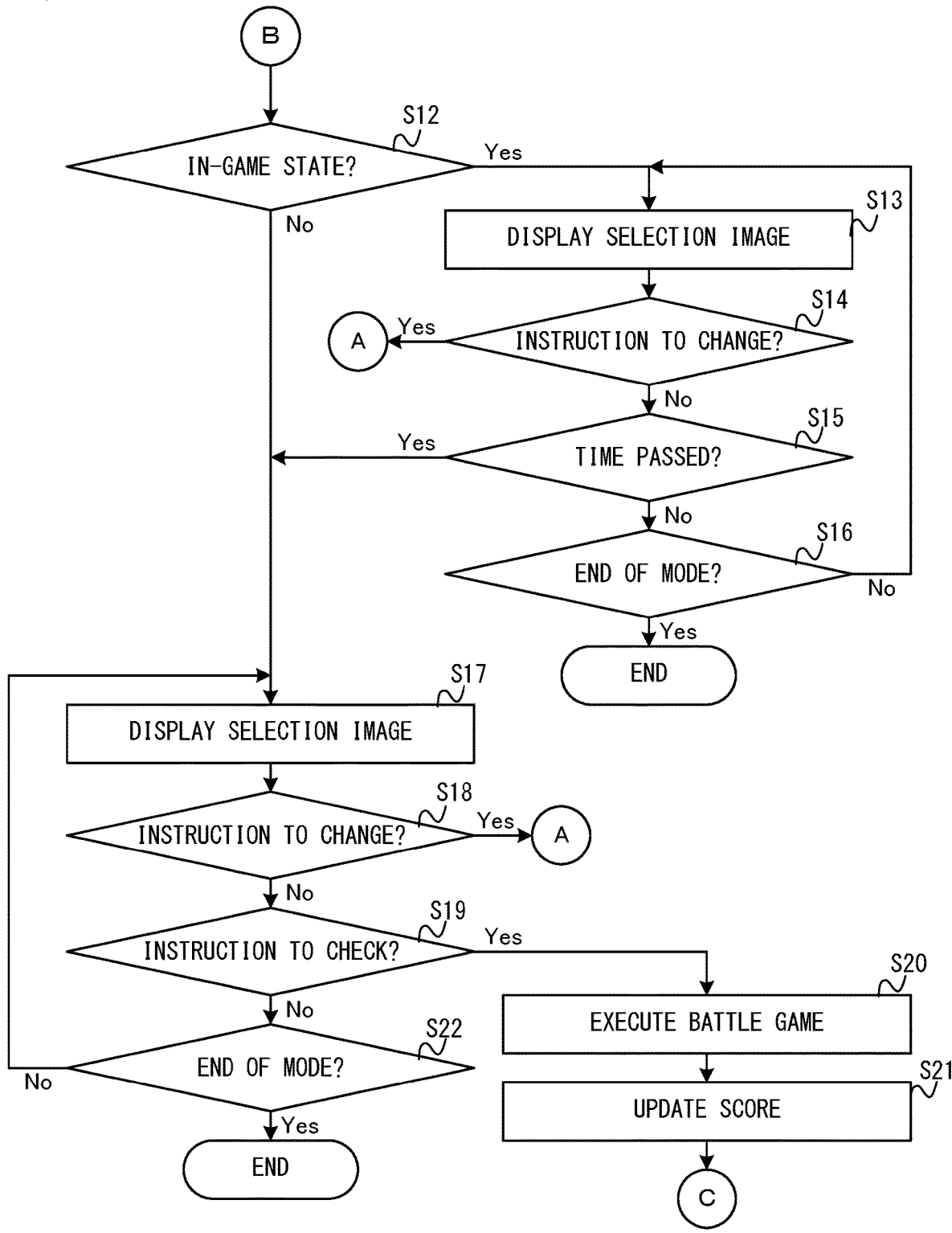
FIG. 12 is a flowchart showing a non-limiting example of a flow of a terminal process that is executed by a terminal apparatus.

FIGS. 11 and 12 are flowcharts showing a non-limiting example of a flow of a terminal process that is executed in the terminal apparatus. Note that the terminal process of FIGS. 11 and 12 is started in response to the user's instruction to start the above score acquisition mode during execution of the terminal-side game program stored in the storage section 22.

Note that in the present embodiment, it is, for example, assumed that steps shown in FIGS. 11-14 are executed by a CPU (in other words, a processor) in the processing section 11 of the server 1 or the processing section 21 of the terminal apparatus 2 executing a game program stored in the storage section 12 or 22. Note that in another non-limiting example embodiment, a portion of the steps may be executed by a processor (e.g., a dedicated circuit) separate from the CPU. In the case where the terminal apparatus 2 can communicate with the server 1, a portion of the steps of FIGS. 11-13 may be executed in the server 1. A portion of the steps of FIG. 14 may be executed in the terminal apparatus 2. The steps of FIGS. 11-14, which are merely illustrative, may be executed in a different order, or another step may be executed in addition to (or instead of) each step, if a similar effect is obtained.

Figure 13:
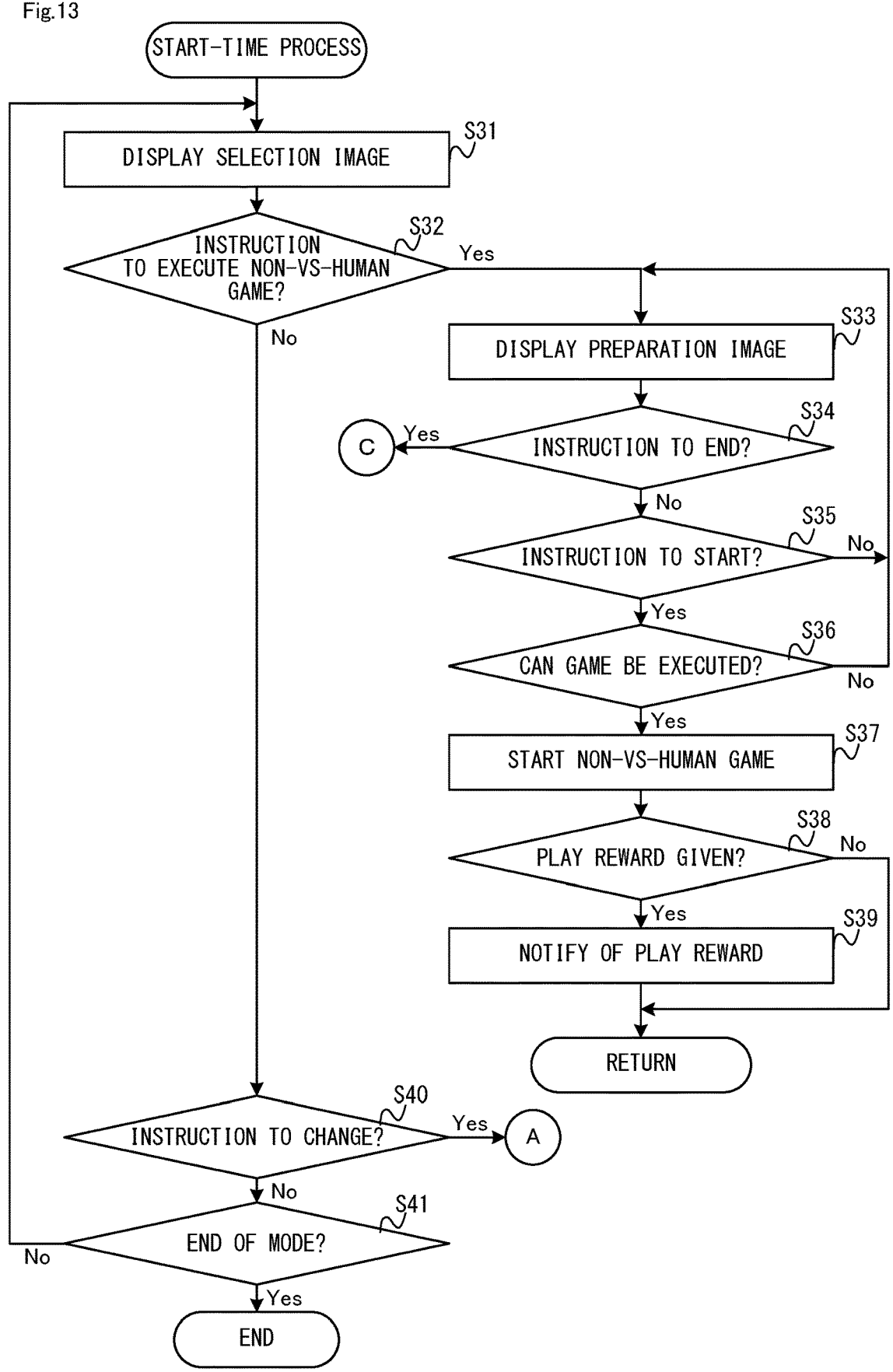
FIG. 13 is a sub-flowchart showing a non-limiting example of a detailed flow of a start-time process of step S11 shown in FIG. 11.

The processing section 21 of the terminal apparatus 2 executes the steps of FIGS. 11-13 using a memory (or the storage section 22). Specifically, the CPU of the processing section 21 stores data obtained in each process step into the memory, and reads and uses the data from the memory when the data is required in a subsequent process step. Likewise, the processing section 11 of the server 1 executes the steps of FIG. 14 using a memory (or the storage section 12). Specifically, the CPU of the processing section 11 stores data obtained in each process step into the memory, and reads and uses the data from the memory when the data is required in a subsequent process step.

In the terminal process of FIG. 11, in step S1, the processing section 21 displays the selection image including the vs-human game button 38 (see FIG. 5). Specifically, the processing section 21 transmits an acquisition request for the user data to the server 1 using the communication section 25. The server 1, when receiving the acquisition request, transmits the user data related to the user to the terminal apparatus 2 (step S52 described below). The user data includes information (e.g., information about a score) that is to be displayed in the selection image. The processing section 21 generates the selection image based on the user data, and displays the selection image on the display section 24. Following step S1, step S2 is executed.

Note that in the present embodiment, it is assumed that during the start of the score acquisition mode, the selection image including the vs-human game button 38 is first displayed. Here, in another non-limiting example embodiment, the selection image including the non-vs-human game button may be first displayed.

In step S2, the processing section 21 determines whether or not the user has given an instruction to execute a vs-human game. Specifically, the processing section 21 determines, based on data from the input section 23, whether or not input has been given to the vs-human game button 38. If the result of the determination in step S2 is positive, step S3 is executed. Meanwhile, if the result of the determination in step S2 is negative, step S8 described below is executed.

In step S3, the processing section 21 determines whether or not a vs-human game can be executed. Specifically, the processing section 21 receives the user's input that specifies a consumption magnification factor, and determines whether or not the current energy value is greater than or equal to a consumed amount calculated from the specified consumption magnification factor. Note that the user data received from the server 1 in step S1 includes data indicating the user's energy value. The processing section 21 determines, based on the user data, whether or not the energy value is greater than or equal to the above consumed amount. If the result of the determination in step S3 is positive, step S4 is executed. Meanwhile, if the result of the determination in step S3 is negative, step S1 is executed again.

In step S4, the processing section 21 executes a vs-human game. Specifically, the processing section 21 transmits an execution notification of the vs-human game to the server 1 using the communication section 25. The server 1, when receiving the execution notification, transmits, to the terminal apparatus 2, game data for use in the vs-human game (specifically, a battle game in the vs-human game) (step S54 described below). The game data includes data of a defensive character, defensive facility, and game map that are to be used in the battle game. The processing section 21 receives the game data from the server 1 using the communication section 25, and executes the battle game using the received game data (see "[2-2. Vs-human game]"). The processing section 21 ends step S4 in response to the end of the battle game. Following step S4, step S5 is executed.

In step S5, the processing section 21 updates the user's score based on a game result of the vs-human game (specifically, a game result of the battle game in the vs-human game) obtained in step S4. The score is updated using the method described above in "[2-2. Vs-human game]." The processing section 21 also displays the updated score on the display section 24 to present the updated score to the user. Furthermore, the processing section 21 transmits data indicating the game result and the updated score to the server 1 using the communication section 25. Following step S5, step S6 is executed.

In step S6, the processing section 21 determines whether or not a play reward has been given in relation to the vs-human game executed in step S4. Here, in the present embodiment, the server 1 transmits, to the terminal apparatus 2, a rewarding result notification indicating whether or not a play reward has been given in relation to the vs-human game executed in step S4 (step S57 described below). The processing section 21 receives the rewarding result notification using the communication section 25, and performs the determination of step S6 based on the rewarding result notification. If the result of the determination in step S6 is positive, step S7 is executed. Meanwhile, if the result of the determination in step S6 is negative, step S1 is executed again.

In step S7, the processing section 21 notifies the user that a play reward has been given. Specifically, the processing section 21 displays, on the display section 24, an image notifying that a play reward has been given. Following step S7, step S1 is executed again.

Meanwhile, in step S8, the processing section 21 determines whether or not the user has given an instruction to change the selection image. Specifically, the processing section 21 determines, based on data from the input section 23, whether or not input has been given to the change button 39 included in the selection image. If the result of the determination in step S8 is negative, step S9 is executed. Meanwhile, if the result of the determination in step S8 is positive, step S10 is executed.

In step S9, the processing section 21 determines whether or not to end the score acquisition mode. Specifically, the processing section 21 determines, based on data from the input section 23, whether or not input has been given to the mode end button 31 included in the selection image. If the result of the determination in step S9 is positive, the processing section 21 ends the terminal process of FIG. 11. Meanwhile, if the result of the determination in step S9 is negative, step S1 is executed again. Subsequently, when the selection image including the vs-human game button 38 is displayed, steps S1-S9 are repeatedly executed. Meanwhile, when the selection image including the non-vs-human game button is displayed, steps S10-S22 are repeatedly executed.

In step S10, the processing section 21 determines whether or not the execution state of the non-vs-human game is the ready-to-start state. Specifically, the processing section 21 transmits an acquisition request similar to that in step S1 to the server 1 using the communication section 25. Note that user data transmitted from the server 1 in response to the acquisition request includes execution state data indicating the execution state of the non-vs-human game. The processing section 21 performs the determination of step S10 based on the user data. If the result of the determination in step S10 is positive, step S11 is executed. Meanwhile, if the result of the determination in step S10 is negative, step S12 is executed (see FIG. 12).

In step S11, the processing section 21 executes a start-time process. The start-time process is executed during the start of the non-vs-human game. A detailed flow of the start-time process will now be described with reference to FIG. 13.

FIG. 13 is a sub-flowchart showing a non-limiting example of a detailed flow of the start-time process of step S11 shown in FIG. 11. In the start-time process, in step S31, the processing section 21 displays the selection image. Specifically, the processing section 21 generates the selection image including the game execution button 61 based on the user data received in step S10, and displays the selection image on the display section 24. Following step S31, step S32 is executed.

In step S32, the processing section 21 determines whether or not the user has given an instruction to execute the non-vs-human game. Specifically, the processing section 21 determines, based on data from the input section 23, whether or not input has been given to the game execution button 61. Note that if the number of times a non-vs-human game has been performed during the current game period has reached the above upper limit, the processing section 21 does not follow the above instruction, and therefore, the result of the determination in step S32 is negative. If the result of the determination in step S32 is positive, step S33 is executed. Meanwhile, if the result of the determination in step S32 is negative, step S40 described below is executed.

In step S33, the processing section 21 displays the preparation image (see FIG. 8) on the display section 24. The processing section 21 also receives the user's input to the preparation image, and according to the input, changes what is indicated by the magnification factor specification image 71 and/or the character set image 74. Following step S33, step S34 is executed.

In step S34, the processing section 21 determines whether or not the user has given an instruction to end displaying of the preparation image. Specifically, the processing section 21 determines, based on data from the input section 23, whether or not input has been given to the end button 79. If the result of the determination in step S34 is positive, the processing section 21 ends the start-time process, and executes step S10 again. Meanwhile, if the result of the determination in step S34 is negative, step S35 is executed.

In step S35, the processing section 21 determines whether or not the user has given an instruction to start the non-vs-human game. Specifically, the processing section 21 determines, based on data from the input section 23, whether or not input has been given to the start button 80. If the result of the determination in step S35 is positive, step S36 is executed. Meanwhile, if the result of the determination in step S35 is negative, step S33 is executed again.

In step S36, the processing section 21 determines whether or not the non-vs-human game can be executed. Specifically, the processing section 21 determines whether or not the current energy value is greater than or equal to a consumed amount calculated from the consumption magnification factor selected at the time of the above start instruction. If the result of the determination in step S36 is positive, step S37 is executed. Meanwhile, f the result of the determination in step S36 is negative, step S33 is executed again.

In step S37, the processing section 21 starts the non-vs-human game. Specifically, the processing section 21 transmits, to the server 1, a start notification indicating that the non-vs-human game has started, using the communication section 25. Following step S37, step S38 is executed.

In step S38, the processing section 21 determines whether or not a play reward has been given in relation to the non-vs-human game started in step S37. Here, in the present embodiment, the server 1 transmits, to the terminal apparatus 2, a rewarding result notification indicating whether or not a play reward has been given in relation to the non-vs-human game started in step S37 (step S61 described below). The processing section 21 receives the rewarding result notification using the communication section 25, and based on the rewarding result notification, performs the determination of step S38. If the result of the determination in step S38 is positive, step S39 is executed. Meanwhile, if the result of the determination in step S38 is negative, the processing section 21 ends the start-time process.

In step S39, the processing section 21 notifies the user that a play reward has been given. Specifically, the processing section 21 displays, on the display section 24, an image notifying that a play reward has been given. After step S39, the processing section 21 ends the start-time process.

Meanwhile, in step S40, the processing section 21 determines whether or not an instruction to change the selection image has been given by the user. Step S40 is similar to step S8. If the result of the determination in step S40 is negative, step S41 is executed. Meanwhile, if the result of the determination in step S40 is positive, the processing section 21 ends the start-time process, and executes step S1 again.

In step S41, the processing section 21 determines whether or not to end the score acquisition mode. Step S41 is similar to step S9. If the result of the determination in step S41 is positive, the processing section 21 ends the start-time process, and also ends the terminal process of FIG. 11. Meanwhile, if the result of the determination in step S41 is negative, step S31 is executed again. Thus, the start-time process of FIG. 13 has been described.

In step S12 of FIG. 12, the processing section 21 determines whether or not the execution state of the non-vs-human game is the ready-to-start state. Note that the determination of step S12 is performed using a method similar to that used in the determination of step S10. If the result of the determination in step S12 is positive, step S13 is executed. Meanwhile, if the result of the determination in step S12 is negative, step S17 described below is executed.

In step S13, the processing section 21 displays the selection image. Specifically, the processing section 21 generates the selection image including the waiting button 62 based on the user data received from the server 1, and displays the selection image on the display section 24. Following step S13, step S14 is executed.

In step S14, the processing section 21 determines whether or not an instruction to change the selection image has been given by the user. Step S14 is similar to step S8. If the result of the determination in step S14 is negative, step S15 is executed. Meanwhile, if the result of the determination in step S14 is positive, step S1 is executed again.

In step S15, the processing section 21 determines whether or not the above predetermined time has passed since the start of the non-vs-human game. Note that during the period that the processing section 21 repeatedly executes a process loop of steps S13-S16, the processing section 21 executes the process loop such that step S15 is executed once a predetermined time (e.g., a one-frame time). If the result of the determination in step S15 is negative, step S16 is executed. Meanwhile, if the result of the determination in step S15 is positive, the execution state of the non-vs-human game transitions to the ready-for-check state, in which step S17 described below is executed.

In step S16, the processing section 21 determines whether or not to end the score acquisition mode. Step S16 is similar to step S9. If the result of the determination in step S16 is positive, the processing section 21 ends the terminal process of FIG. 11. Meanwhile, if the result of the determination in step S16 is negative, step S13 is executed again.

In step S17, the processing section 21 displays the selection image. Specifically, the processing section 21 generates the selection image including the check instruction button 63 based on the user data received from the server 1, and displays the selection image on the display section 24. Following step S17, step S18 is executed.

In step S18, the processing section 21 determines whether or not an instruction to change the selection image has been given by the user. Step S18 is similar to step S8. If the result of the determination in step S18 is negative, step S19 is executed. Meanwhile, if the result of the determination in step S18 is positive, step S1 is executed again.

In step S19, the processing section 21 determines whether or not the above result check instruction to check a game result of the non-vs-human game has been given by the user. Specifically, the processing section 21 determines, based on data from the input section 23, whether or not input has been given to the check instruction button 63. If the result of the determination in step S19 is positive, step S20 is executed. Meanwhile, if the result of the determination in step S19 is negative, step S22 described below is executed.

In step S20, the processing section 21 executes a battle game in the non-vs-human game. Specifically, the processing section 21 transmits, to the server 1, a check request for checking a game result of the non-vs-human game using the communication section 25. The server 1, when receiving the check request, operates each character (an offensive character and a defensive character) in the battle game, so that the battle game proceeds, and transmits game data indicating proceeding of the battle game to the terminal apparatus 2. For example, this game data may indicate either details of the operation performed on each character or detailed movements of each character. The processing section 21 displays, on the display section 24, a game image indicating how the battle game proceeds, based on the above game data received from the server 1 (therefore, the battle game in the non-vs-human game can be said to be executed in the terminal apparatus 2 as well as in the server 1). The processing section 21 displays the above game image on the display section 24 until the end of the battle game. Following step S20, step S21 is executed.

In step S21, the processing section 21 updates the user's score based on a game result of the non-vs-human game (specifically, a game result of the battle game in the non-vs-human gam) executed in step S20. The score is updated using the method described above in "[2-3. Non-vs-human game]." The processing section 21 also displays the updated score on the display section 24 in order to present the updated score to the user. Furthermore, the processing section 21 transmits data indicating the updated score to the server 1 using the communication section 25. Following step S21, step S10 is executed again.

Meanwhile, in step S22, the processing section 21 determines whether or not to end the score acquisition mode. Step S22 is similar to step S9. If the result of the determination in step S22 is positive, the processing section 21 ends the terminal process of FIG. 11. Meanwhile, if the result of the determination in step S22 is negative, step S17 is executed again.

[3-3. Process by Server]

FIG. 14 is a flowchart showing a non-limiting example of a flow of a server process that is executed by the server 1. Note that a series of steps shown in FIG. 14 is continuously executed during operation of the server 1.

In the server process of FIG. 14, in step S51, the processing section 11 determines whether or not the above acquisition request has been received from the terminal apparatus 2 through the communication section 13. If the result of the determination in step S51 is positive, step S52 is executed. Meanwhile, if the result of the determination in step S51 is negative, step S53 is executed.

In step S52, the processing section 11 transmits, to the terminal apparatus 2, user data related to the user of the terminal apparatus 2, which is the sender of the acquisition request, of the user data stored in the server 1, using the communication section 13. This user data includes the above score data, energy value data, and execution state data. Following step S52, step S53 is executed.

In step S53, the processing section 11 determines whether or not a vs-human game is to be executed in the terminal apparatus 2. Specifically, the processing section 11 determines whether or not the above execution notification of a vs-human game has been received from the terminal apparatus 2 through the communication section 13. If the result of the determination in step S53 is positive, step S54 is executed. Meanwhile, if the result of the determination in step S53 is negative, step S58 is executed.

In step S54, the processing section 11 executes a vs-human game process for performing the vs-human game in the terminal apparatus 2. Specifically, the processing section 11 selects another user who is to be an opponent in the vs-human game, and specifies a defensive character, defensive facility, and game map that are to be used in a battle game, based on user data related to the second user (specifically, record data and character data included in the user data). Note that the method of selecting the second user is not particularly limited. For example, the second user may be selected based on the score and/or ranking of the user of the terminal apparatus 2. Next, the processing section 11 transmits, to the terminal apparatus 2, game data indicating the specified defensive character, defensive facility, and game map using the communication section 13. As a result, the battle game in the vs-human game is executed in the terminal apparatus 2.

The terminal apparatus 2 also transmits, to the server 1, data indicating a game result of the above vs-human game and the updated score (step S5). Therefore, in the above vs-human game process, based on that data, the processing section 11 updates the score data stored in the server 1. The processing section 11 also updates the score data of the opposing user participating in the above vs-human game, based on the above game result. Furthermore, the processing section 11 updates the score data stored in the server 1 such that the energy value of the user who has performed the vs-human game is reduced. Following step S54, step S55 is executed.

In step S55, the processing section 11 determines whether or not to give a play reward in relation to the vs-human game executed in step S54. Specifically, the processing section 11 determines whether or not the above reward condition related to the above vs-human game is satisfied. If the result of the determination in step S55 is positive, step S56 is executed. Meanwhile, if the result of the determination in step S55 is negative, step S56 is skipped, and step S57 is executed.

In step S56, the processing section 11 gives a play reward to the user of the terminal apparatus 2. Specifically, the processing section 11 updates the user data stored in the server 1 such that the giving of a play reward is reflected in the updated user data. Following step S56, step S57 is executed.

In step S57, the processing section 11 transmits the above rewarding result notification to the terminal apparatus 2 using the communication section 13. Specifically, the processing section 11 transmits, to the terminal apparatus 2, the rewarding result notification indicating whether or not a play reward has been given in relation to the vs-human game executed in step S54. Following step S57, step S58 is executed.

In step S58, the processing section 11 determines whether or not a non-vs-human game is to be started in the terminal apparatus 2. Specifically, the processing section 11 determines whether or not the start notification of the above non-vs-human game (step S37) has been received from the terminal apparatus 2 through the communication section 13. If the result of the determination in step S58 is positive, step S59 is executed. Meanwhile, if the result of the determination in step S58 is negative, step S62 described below is executed.

In step S59, the processing section 11 determines whether or not to give a play reward in relation to the non-vs-human game executed in step S58. Specifically, the processing section 11 determines whether or not the above reward condition is satisfied in relation to the above non-vs-human game. If the result of the determination in step S59 is positive, step S60 is executed. Meanwhile, if the result of the determination in step S59 is negative, step S60 is skipped, and step S61 is executed.

In step S60, the processing section 11 gives a play reward to the user of the terminal apparatus 2. Step S60 is similar to step S56. Following step S60, step S61 is executed.

In step S61, the processing section 11 transmits the above rewarding result notification to the terminal apparatus 2 using the communication section 13. Specifically, the processing section 11 transmits, to the terminal apparatus 2, the rewarding result notification indicating whether or not a play reward has been given in relation to the non-vs-human game executed in step S58. The processing section 11 also updates the score data stored in the server 1 such that the energy value of the user who has performed the non-vs-human game is reduced. Furthermore, the processing section 11 updates the execution state data included in the user data related to the user stored in the server 1 such that the execution state data indicates the waiting-for-result state. Although not shown, if the above predetermined time has passed since the start of the non-vs-human game, the processing section 11 updates the above execution state data stored in the server 1 such that the above execution state data indicates the ready-for-check state. Following step S61, step S62 is executed.

In step S62, the processing section 11 determines whether or not the above check request (step S20) has been received from the terminal apparatus 2 through the communication section 13. If the result of the determination in step S62 is positive, step S63 is executed. Meanwhile, if the result of the determination in step S62 is negative, step S51 is executed again.

In step S63, the processing section 11 executes a non-vs-human game process for executing a non-vs-human game. Specifically, the processing section 11 initially sets each character, each facility, and a game map that are to be used in a battle game in the non-vs-human game. Concerning this setting, an offensive character and an offensive facility are set based on the record data and character data included in the user data (specifically, the user data related to the user who performs the non-vs-human game) stored in the server 1. A defensive character, defensive facility, and game map are set based on the non-vs-human game defense data stored in the server 1. Next, the processing section 11 operates each character in the battle game thus set, so that the battle game proceeds (see "[2-3. Non-vs-human game]"). The processing section 11 also transmits, to the terminal apparatus 2, game data indicating the proceeding of the battle game using the communication section 13. As a result, the terminal apparatus 2 displays how the battle game is proceeding. Note that the terminal apparatus 2 transmits, to the server 1, data indicating the score updated based on a game result of the non-vs-human game (step S5), and therefore, based on that data, the processing section 11 updates the score data stored in the server 1. The processing section 11 also updates the execution state data included in the user data related to the user stored in the server 1 such that the execution state data indicates the ready-to-start state. Following step S63, step S51 is executed again.

[4. Advantageous Effects and Variations of Present Embodiment]

As described above, in the above non-limiting example embodiments, the information processing system executes a predetermined process using the values of scores of a plurality of users that are updated based on a result of a game. The information processing system is configured to have the following means.

Game selection means for selecting one of a first game (e.g., a vs-human game) and a second game (e.g., a non-vs-human game), in the game, based on a first user's selection operation (step S2, S32)

First game execution means for, when the first game is selected, executing the first game, in which a result of the game is determined based on the first user's game operation in the first game, and an opponent based on data of a second user different from the first user (step S4)

Second game execution means for, when the second game is selected, executing the second game, in which a result of the game is determined independently of the first user's game operation (step S20, S37)

First updating means for updating the first user's score and the second user's score based on a result of the first game (step S5)

Second updating means for updating at least the first user's score based on a result of the second game (step S21)

With the above configuration, not only can the user acquire a score using the first game, in which a game result is determined based on another user's data, but also can acquire a score using the second game, in which another user is not involved. For example, this allows a user having such a play style that the user does not tend to do the first game to be motivated to participate in the game. Therefore, users having various play styles can be motivated to participate in the game.

Note that the above "predetermined process" in the above non-limiting example embodiments includes, but is not limited to, a process of determining a ranking based on a score and a process of giving a reward corresponding to the ranking to the user. For example, in another non-limiting example embodiment, the information processing system may execute, as the above "predetermined process," a process of ranking each user, a process of notifying the user of their ranking, and/or a process of giving the user a reward corresponding to a score (without calculating a ranking).

The above "game operation" refers to an operation that is performed during execution of a game, and has an influence on a game result. For example, an operation that is performed before a game (e.g., an operation of previously setting a character that is to be used in a game) is not the above game operation. In addition, an operation that is performed during execution of a game, but does not have an influence on a game result (e.g., an operation of displaying a game result on a terminal apparatus) is not the above game operation.

(Variations Related to Details of Game)

In the above non-limiting example embodiments, a battle game is performed in both a vs-human game and a non-vs-human game, and therefore, it can be said that the game rule of a vs-human game and the game rule of a non-vs-human game are at least partially the same. Here, if it is assumed that a vs-human game and a non-vs-human game are completely different and have totally different game rules, a single type of score is acquired from the two totally different types of games, and therefore, the user is likely to feel unnaturalness. In contrast to this, if the two game rules at least overlap like in the above non-limiting example embodiments, the user can feel the integrity of the two types of games in the score acquisition mode, and therefore, the user can be less likely to feel unnaturalness. Note that in another non-limiting example embodiment, in a non-vs-human game, a game having a game rule different from that of a vs-human game may be performed. For example, in a non-vs-human game, a game may be performed that is different from a battle game that is performed in a vs-human game.

Furthermore, in the above non-limiting example embodiments, the information processing system can execute a non-vs-human game using game contents (e.g., a character and a facility) that can be used in a vs-human game. This allows the user who has been performing one of a vs-human game and a non-vs-human game to start the other game without newly preparing game contents. Therefore, the user can be motivated to perform a vs-human game and a non-vs-human game. For example, the user can also use game contents reinforced for a vs-human game in a non-vs-human game, and therefore, the user who performs a vs-human game can be motivated to perform a non-vs-human game.

Note that in another non-limiting example embodiment, game contents that can be used in a vs-human game may be different from game contents that can be used in a non-vs-human game. Specifically, in another non-limiting example embodiment, game contents for a vs-human game may be prepared separately from game contents for a non-vs-human game.

Note that in another non-limiting example embodiment, the information processing system may not include a portion of the configuration of the above non-limiting example embodiments, and may not execute a portion of the process executed in the above non-limiting example embodiments. For example, in order to exhibit a particular one of the effects of the above non-limiting example embodiments, the information processing system may include a configuration for exhibiting that effect and may execute a process for exhibiting that effect, and may not include other configurations or may not execute other processes.

The above non-limiting example embodiments can be applied to, for example, a game system or game program for the purpose of motivating users having more various play styles to participate in a game in which users compete with each other, etc.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system for executing varied gameplay for users of a video game, the information processing system comprising:
a processor and a memory coupled thereto, the processor being configured to control the information processing system to at least:
store an accumulated score for a first user;
as part of the video game, present a graphical user interface that allows for selection of a first game and a second game based on a selection operation performed by the first user;
based on the first game being selected:
execute the first game, and
as part of the first game, process commands received from the first user to control at least one virtual character within a virtual space against at least one opposing character or object that has been specified by a second user that is an opponent of the first user;
obtain a result of the first game based on how the first user has controlled the at least one virtual character within a virtual space for the first game against the at least one opposing character or object that had been specified by the second user;

based on the second game being selected:
process commands received from the first user to select at least one virtual character that is to be used in connection with performance of the second game, and
perform the second game automatically without relying input commands received from at least the first user during execution of the second game;
obtain, based on the performance of the second game, a result for the second game;
based on the result of the first game being obtained, update the accumulated score for the first user and also update an accumulated score for the second user based on the result of the first game; and
based on the result of the second game being obtained, update at least the accumulated score for the first user based on the result of the second game.

2. The information processing system according to claim 1, wherein
when a game result is obtained in the second game the first user's accumulated score is updated based on a calculation method with which an increase in the accumulated score of the first user is smaller than when a same game result is obtained in the first game.

3. The information processing system according to claim 1, wherein
the processor is configured to further control the information processing system to:
reduce a parameter in response to execution of the first game or the second game, wherein execution of the first game is limited when the parameter is smaller than a first value, and
wherein execution of the second game is limited when the parameter is smaller than a second value that is the same as or different from the first value.

4. The information processing system according to claim 3, wherein a number of times the second game is executed during a predetermined period is limited in a manner that is independent of a value of the parameter.

5. The information processing system according to claim 1, wherein the processor starts the second game based on selection of the second game,
wherein the accumulated score for the first user is based on the result of the second game that is determined after a predetermined time has passed since start of the second game, wherein
execution of a next instance of the second game is limited until at least the predetermined time has passed since start of a prior instance of the second game.

6. The information processing system according to claim 5, wherein the first game is executed in response to selection of the first game even before the predetermined time has passed since start of the second game.

7. The information processing system according to claim 5, wherein the processor is further configured to control the information process system to:
start the first game in response to selection of the first game, and following the start, process game operations provided by the first user, and end the first game based on determination of the result of the first game based on the first user's game operation,
end the second game in response to determination of the result of the second game after the predetermined time has passed since start of the second game, and
give a reward to the first user in response to end of the first game or start of the second game, under a condition.

8. The information processing system according to claim 5, the processor is further configured to control the information process system to: present the result of the second game to the first user in response to the first user's operation performed after the predetermined time has passed since start of the second game.

9. The information processing system according to claim 1, wherein
a game rule of the first game and a game rule of the second game are at least partially the same.

10. The information processing system according to claim 9, wherein the second game is executed using a game content that is also usable in the first game.

11. A non-transitory computer-readable storage medium having stored therein instructions that, when executed by a processor of an information processing apparatus included in an information processing system for executing a process using values of scores of a plurality of users that are updated based on a result of a game, cause the information processing apparatus to perform operations comprising:
storing an accumulated score for a first user;
as part of the video game, presenting a graphical user interface that allows for selection of a first game and a second game based on a selection operation performed by the first user;
based on the first game being selected:
  executing the first game, and
  as part of the first game, processing commands received from the first user to control at least one virtual character within a virtual space against at least one opposing character or object that has been specified by a second user that is an opponent of the first user;
obtaining a result of the first game based on how the first user has controlled the at least one virtual character within a virtual space for the first game against the at least one opposing character or object that had been specified by the second user;
based on the second game being selected:
  processing commands received from the first user to select at least one virtual character that is to be used in connection with performance of the second game, and
  performing the second game automatically without relying input commands received from at least the first user during execution of the second game;
obtaining, based on the performance of the second game, a result for the second game;
based on the result of the first game being obtained, updating the accumulated score for the first user and also update an accumulated score for the second user based on the result of the first game; and
based on the result of the second game being obtained, updating at least the accumulated score for the first user based on the result of the second game.

12. An information processing apparatus included in an information processing system for executing varied gameplay for users of a video game, the information processing apparatus comprising:
a processor and a memory coupled thereto, the processor being configured to control the information processing system to at least:
  store an accumulated score for a first user;
  as part of the video game, present a graphical user interface that allows for selection of a first game and a second game based on a selection operation performed by the first user;
  based on the first game being selected:
    execute the first game, and
    as part of the first game, process commands received from the first user to control at least one virtual character within a virtual space against at least one opposing character or object that has been specified by a second user that is an opponent of the first user;
  obtain a result of the first game based on how the first user has controlled the at least one virtual character within a virtual space for the first game against the at least one opposing character or object that had been specified by the second user;
  based on the second game being selected:
    process commands received from the first user to select at least one virtual character that is to be used in connection with performance of the second game, and
    perform the second game automatically without relying input commands received from at least the first user during execution of the second game;
  obtain, based on the performance of the second game, a result for the second game;
  based on the result of the first game being obtained, update the accumulated score for the first user and also update an accumulated score for the second user based on the result of the first game; and
  based on the result of the second game being obtained, update at least the accumulated score for the first user based on the result of the second game.

13. A game processing method executable in an information processing system for executing varied gameplay for users of a video game, the game processing method comprising:
storing an accumulated score for a first user;
as part of the video game, presenting a graphical user interface that allows for selection of a first game and a second game based on a selection operation performed by the first user;
based on the first game being selected:
  executing the first game, and
  as part of the first game, processing commands received from the first user to control at least one virtual character within a virtual space against at least one opposing character or object that has been specified by a second user that is an opponent of the first user;
obtaining a result of the first game based on how the first user has controlled the at least one virtual character within a virtual space for the first game against the at least one opposing character or object that had been specified by the second user;
based on the second game being selected:
  processing commands received from the first user to select at least one virtual character that is to be used in connection with performance of the second game, and
  performing the second game automatically without relying input commands received from at least the first user during execution of the second game;
obtaining, based on the performance of the second game, a result for the second game;
based on the result of the first game being obtained, updating the accumulated score for the first user and also update an accumulated score for the second user based on the result of the first game; and based on the result of the second game being obtained, updating at least the accumulated score for the first user based on the result of the second game.

* * * * *